United States Patent
McBrayer et al.

(10) Patent No.: US 12,429,458 B2
(45) Date of Patent: Sep. 30, 2025

(54) NON-DESTRUCTIVE TESTING OF COMPOSITE COMPONENTS

(71) Applicant: DELTA ENGINEERING CORPORATION, Newark, DE (US)

(72) Inventors: Isabel McBrayer, Flagler Beach, FL (US); Fady F. Barsoum, Oviedo, FL (US); Dallas Nagle, Dover, DE (US); Benjamin Stanford, Tolland, CT (US)

(73) Assignee: Delta Engineering Corporation, Newark, DE (US)

( * ) Notice: Subject to any disclaimer, the term of this patent is extended or adjusted under 35 U.S.C. 154(b) by 310 days.

(21) Appl. No.: 18/044,431

(22) PCT Filed: Jul. 7, 2022

(86) PCT No.: PCT/US2022/036332
§ 371 (c)(1),
(2) Date: Mar. 8, 2023

(87) PCT Pub. No.: WO2023/283319
PCT Pub. Date: Jan. 12, 2023

(65) Prior Publication Data
US 2024/0027401 A1 Jan. 25, 2024

Related U.S. Application Data

(60) Provisional application No. 63/219,718, filed on Jul. 8, 2021.

(51) Int. Cl.
*G01N 29/07* (2006.01)
*G01N 29/04* (2006.01)

(52) U.S. Cl.
CPC .......... *G01N 29/07* (2013.01); *G01N 29/045* (2013.01); *G01N 2291/011* (2013.01); *G01N 2291/0231* (2013.01)

(58) Field of Classification Search
CPC .............. G01N 29/07; G01N 29/045; G01N 2291/011; G01N 2291/0231; G01N 2291/0289; G01N 29/14; G01N 29/4454
(Continued)

(56) References Cited

U.S. PATENT DOCUMENTS

| 9,599,576 B1 | 3/2017 | Portune et al. |
| 2014/0286478 A1 | 9/2014 | Paulus et al. |

(Continued)

FOREIGN PATENT DOCUMENTS

| WO | WO 2020041891 | 3/2020 |
| WO | WO 2020048188 | 3/2020 |

OTHER PUBLICATIONS

International Preliminary Report on Patentability in International Appln. No. PCT/US2022/036332, mailed on Jan. 18, 2024, 9 pages.

(Continued)

*Primary Examiner* — Peter J Macchiarolo
*Assistant Examiner* — John M Royston
(74) *Attorney, Agent, or Firm* — Fish & Richardson P.C.

(57) ABSTRACT

This disclosure describes systems, methods, and an apparatus for non-destructively assessing composites. The behavior of propagating elastic waves through a structure can provide significant information on the structure and has thus been studied extensively for development of structural monitoring techniques. In thin plates guided waves can develop, which are inherently dispersive, with highly material dependent dispersion characteristics. The identification of the different parameters within a laminate that may affect their mechanical properties is an important step in the assessment of laminate structures.

10 Claims, 19 Drawing Sheets

Lamb wave reflections

(58) Field of Classification Search
USPC .......................................................... 73/584
See application file for complete search history.

(56) References Cited

U.S. PATENT DOCUMENTS

| 2018/0059064 | A1  | 3/2018  | Tat et al. |            |
|--------------|-----|---------|------------|------------|
| 2020/0333297 | A1  | 10/2020 | Jack et al. |           |
| 2021/0025854 | A1  | 1/2021  | Salamone et al. |       |
| 2021/0341426 | A1* | 11/2021 | Kondoh ................. | G01N 29/42 |
| 2022/0316656 | A1* | 10/2022 | Burks .................... | F17C 13/02 |

OTHER PUBLICATIONS

Extended European Search Report in European Appln. No. 22838390.7, mailed on Nov. 19, 2024, 11 pages.

International Search Report and Written Opinion in International Appln. No. PCT/US2022/036332, mailed on Dec. 15, 2022, 12 pages.

McBrayer, "Materials Characterisation to Composite Laminates by Non-Destructive Techniques" Dissertation for the Degree of Doctor of Philosophy, Embry Riddle Aeronautical University, Apr. 2021, 186 pages.

Crawford et al., "Analysis of Acoustic Emission Propagation in Metal-to-Metal Adhesively Bonded Joints" Journal of Nondestructive Evaluation, vol. 37, No. 2, May 4, 2018, 19 pages.

Partial Supplementary European Search Report in European Appln. No. 22838390.7, mailed on Aug. 26, 2024, 13 pages.

Yilmaz et al., "Non-Destructive Determination of the stiffness matrix of a laminated composite structure with lamb wave" Composite Structures, Elsevier Science LTD, vol. 237, Jan. 22, 2020, 8 pages.

* cited by examiner

Warp and Weft of a Woven Fabric

Test Equipment Examples

FIG. 7 Important Parameters of an Acoustic Emission Waveform

Representation of good Timing Parameter Settings

Sensor Set-Up for Wavespeed calculations at angles of 0, 45, and 90 degrees with respect to laminate Cross-Sections of A) Resin Starved, B) Normal Saturation and C) Resin Rich Laminates Scalograms for a) Panel 1-$[0]_{16}$, b) Panel 2 - $[0/90]_8$, c) Panel 3 - $[0/45]_8$, d) Panel 4-$[0/45/90/-45]_4$ and e) Panel 5-$[0/45/90/-45]_{2S}$ Test Set-up for Angle testing. PLBs represented by "x" at 30, 50, 100, 150, 200, and 250mm at angle increments of 15 degrees

NON-DESTRUCTIVE TESTING OF COMPOSITE COMPONENTS

CROSS-REFERENCE TO RELATED APPLICATIONS

This application is a is a National Stage Application under 35 U.S.C. § 371 and claims the benefit of International Application No. PCT/US2022/036332, filed on Jul. 7, 2022, which claims the benefit of priority to U.S. Application No. 63/219,718, filed on Jul. 8, 2021, the contents of which are hereby incorporated by reference.

TECHNICAL FIELD

This disclosure generally relates Non-Destructive Testing (NDT) techniques for adequately assessing manufacturing quality and strength of completed composite parts as well as determining properties of the composite and monitoring of structural health.

BACKGROUND

Composite structures are increasingly popular in many industries today, including aerospace, marine, automotive, and renewable energy industries, as advancements occur in the development of new fibers and resins. In part, they are selected due to their high strength-to-weight ratio, but also for their corrosion resistance, and design flexibility. The ability to tailor the structural properties of a laminate part by incorporating different fabric weaves, stacking sequence and fiber type allows designers a wider range of options to create more complex shapes, prioritize directional strength, or improve the flexibility of a structure. As a consequence, if a laminate's properties are unknown, there are a wide range of possible variable factors that would affect the strength and elastic properties. Variations in lay-up procedure and materials can make calculations inherently difficult, and introduce difficulties in failure prediction. In addition, once damaged, the overall structural strength of composites may be significantly affected and assessment of the extent of the damage is challenging. Therefore, certification of composite parts and repairs with governing bodies, such as the Federal Aviation Administration (FAA), often requires ultimate load testing of identical articles. This is an expensive process to undertake, especially for a repair which is usually unique.

SUMMARY

In general, the disclosure involves techniques for non-destructively identifying properties of a composite material. In implementations these combine an apparatus (e.g., a sensor and signal generator), with methods that are adapted to the apparatus for identifying properties of the composite materials.

In one aspect there is described a method for non-destructively identifying properties of a composite material including inducing a plurality of acoustic emission events on the composite material at a plurality of predetermined locations relative to a sensor. The method further includes receiving information from the sensor associated with the acoustic emission events and identifying a variation in peak fundamental antisymmetric (A0) and symmetric (S0) frequency components of the received information. One or more laminate parameters of the composite material is determined based on the variation. The method further includes identifying a wavespeed of the acoustic emission events and determining, based on the identified wavespeed, a fiber type of the composite material.

Implementations can optionally include one or more of the following features.

In some implementations, the identified wavespeed includes wavespeed in at least a first direction of propagation and a second direction of propagation, and the second direction of propagation is 45 degrees different than the first direction of propagation. The identified wavespeed in the first direction and the identified wavespeed in the second direction of propagation are divided to determine a wavespeed ratio and, in response to determining the wavespeed ratio is in the range of 0.95 to 1.05, determining that an equal number of 45°/−45° to 0°/90° plies are present in the composite material In some implementations, the determined fiber type is at least one of a carbon fiber or glass fiber.

In some implementations, the determined laminate parameters include resin type. In some implementations, the resin type is at least one of epoxy resin or Cyanate Ester resin.

In some implementations the acoustic events are simulated acoustic emission events. In some implementations, the acoustic events are Hsu-Nielsen Pencil Lead Break (PLB) events.

In some implementations the sensor is an array of sensors including a primary sensor located 60 mm from a first acoustic emissions event, and the sensor array includes a secondary sensor located 200 mm from the first acoustic emissions event. In some implementations, the sensors in the array are broadband S9208 acoustic sensors.

In some implementations, the predetermined plurality of locations includes a plurality of rows of locations at 30 mm, 50 mm, 100 mm, 150 mm, 200 mm, and 250 mm distances from the sensor, each row of locations extending from the sensor at a 15 degree angle from adjacent rows of locations.

In some implementations, the peak fundamental antisymmetric (A0) is in the range of 20 to 120 kHz, and the fundamental symmetric (S0) frequency is in the range of 170 to 625 kHz.

Implementations can include one or more of the following advantages. Non-destructively testing material can result in reduced facility requirements and maintenance requirements to verify structural integrity and composition of materials. Another advantage is that techniques described herein can be used to detect flaws on in-service structures. This gives it potential as a technique for inspecting composite alterations and repairs. The disclosed techniques allow an entire structure to be inspected for different types of defects with a single test. They are also capable of discerning internal damage within a laminate. Often, acoustic emission testing can be used in conjunction with ultrasound to more efficiently locate damage and collect information about the damage.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

To describe technical solutions in the implementations of the present specification or in the existing technology more clearly, the following briefly describes the accompanying drawings needed for describing the implementations or the existing technology. It is apparent that the accompanying drawings in the following descriptions merely show some implementations of the present specification, and a person of ordinary skill in the art can still derive other drawings from these accompanying drawings without creative efforts.

DETAILED DESCRIPTION

Figure 1:
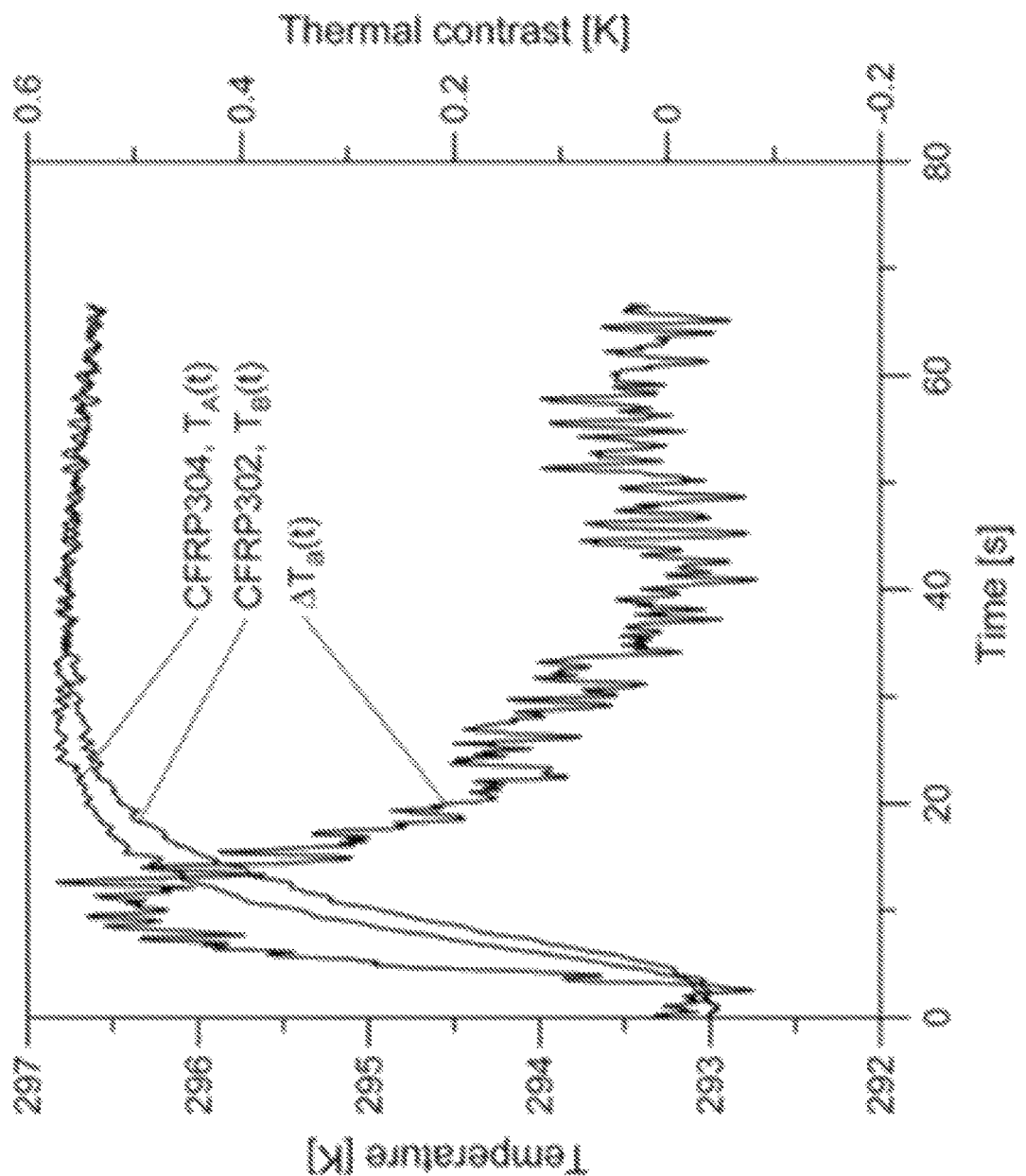
FIG. 1 illustrates temperature increase and subsequent decay at a reference point on two carbon fiber reinforced specimens.

This disclosure describes systems, methods, and an apparatus for non-destructively assessing composites. The behavior of propagating elastic waves through a structure can provide significant information on the structure and has thus been studied extensively for development of structural monitoring techniques. In thin plates guided waves can develop, which are inherently dispersive, with highly material dependent dispersion characteristics. The identification of the different parameters within a laminate that may affect their mechanical properties is an important step in the assessment of laminate structures. Manufacturing parameters may be varied which can cause variations in strength and stiffness properties of a structure. To aid in the maintenance and design of repairs and alterations, various techniques for assessing these properties are provided.

Since composite structure is more complex to assess than metallic structure, compliance with the FAA requirements for proof of structural integrity is often tested based on failure of identical parts. The larger composite aircraft manufacturers include specific repair designs within the aircraft's Structural Repair Manual (SRM). These repair designs are developed by way of testing identical specimens until failure, so that the manufacturer may attain type certification from regulatory bodies. Often, for ease of certification, aircraft maintenance organizations are required to use epoxy pre-impregnated carbon fiber (prepregs) for repairs. Prepregs must usually be stored in large commercial freezers, and they have a limited shelf life. Smaller maintenance facilities and even some larger Maintenance, Repair and Overhaul (MRO) organizations do not have such facilities. Prepreg scarf repairs are, thus, impractical for many aircraft operators. This is particularly so when the item requiring repair is owned by a small company or cannot easily be taken to specialized repair facilities.

Another important aspect to consider when repairing or altering composite structure is knowledge of the material properties of the base structure. Both static strength and fatigue strength are affected by aspects such as tow (describing the number of fibers bundled together in one strand of a woven composite), weave patterns, stacking sequence, resin type, and fiber materials. Knowledge of the fatigue properties of a structure is required in order to be able to design an appropriate repair or alteration that retains the existing overall strength of the structure, per FAA requirements. FAA Advisory Circular 43-214A states that "When material specifications are called out in the repair or alteration drawings or other documents, the materials used must meet the qualification requirements in the material specifications. AC 23-20 provides guidance on specifications for polymer matrix composites. Material specifications (for adhesives, resins, prepreg tape and fabric, core materials, metals, etc.) must define the required material". This has to do with the material constituent requirements for a repair or laminate.

Federal Aviation Regulations, Sub Part C, Sec. 25.305, "Strength and Deformation" requires that:

"The structure must be able to support limit loads without any detrimental permanent deformation. At any load up to limit loads the deformation may not interfere with safe operation."; "When analytical methods are used to show compliance with the ultimate load strength requirements, it must be shown that—(1) The effects of deformation are not significant; (2) The deformations involved are fully accounted for in the analysis; or (3) The methods and assumptions used are sufficient to cover the effects of these deformations."; and "Where structural flexibility is such that any rate of load application likely to occur in the operating conditions might produce transient stresses appreciably higher than those corresponding to static loads, the effects of this rate of application must be considered."

This relates to aspects involved in the repair that influence strength and stiffness. Confirmation is required that the material specifications of the repair or alteration will not result in excess deformation to the existing structure, under normal operating conditions, or deform significantly in itself. This cannot be proven by analysis unless material specifications of underlying, existing structure is known. Since, in some cases, excess structure is not available to industry operators of composite structure components, establishing these properties may, in these cases, only viably be carried out by non-destructive methods.

1.1 Non-Destructive Testing

Non-Destructive Testing (NDT) of Aerospace components is a long-established type of technique for assessing the extent of cracks and flaws, such as corrosion, porosity and fretting, that might reduce the structural integrity of a component. Standards have been created to define accepted NDT programs for the inspection of an aircraft for both metallic and composite structures. The standards surrounding composite structures are relatively new, when compared with the standards for metallic structures and are consequently more limited. The NDT methods described as acceptable for inspections of Aerospace components by the American Society for Testing and Materials (ASTM) standard E2533. The most commonly employed of these methods are Visual Inspection (VI) and Ultrasonic Testing (UT). There are, of course, limitations associated with each of these.

Visual inspection can be inexpensive. It can be implemented using optical aids, such as magnifiers, and is often the first stage of any inspection. However, it is difficult to detect very small flaws or internal damage using this method. Introduction of more extensive magnification by way of Scanning Electron Microscopy (SEM) or Transmission Electron Microscopy (TEM) can greatly increase the detail that may be viewed, but this instrumentation is costly.

Classic ultrasound is a useful method for detecting both the size and type of damage. It is capable of detecting internal damage, although substructure can inhibit the integrity of the results. Guided wave type ultrasound can mitigate such concerns through identification of time-frequency discontinuities. Guided waves themselves are not a technique, but a result of excitation and the inherent properties of a structure, and they can be excited by various non-destructive methods.

A disadvantage of classic ultrasound is that it is a slow process when it is employed to detect damage on a large structure, for example a ship or commercial aircraft. Operation involves applying a pulse across the thickness of the structure. For large structures, the pulse would have to be applied over the entire area of each panel.

Acoustic Emission (AE) testing is a useful method of non-destructive evaluation of composites. Sometimes AE is not considered completely non-destructive due to the technique's reliance on microdamage propagation creating acoustic events. A major advantage of AE is that it can be used to detect flaws on in-service structures. This gives it great potential as a technique for inspecting composite alterations and repairs. AE allows an entire structure to be inspected for different types of defects with a single test. It is also capable of discerning internal damage within a laminate. Often, AE testing can be used in conjunction with ultrasound to more efficiently locate damage and collect information about the damage.

A highly successful and frequently researched process for identifying damage such as subsurface delaminations within a composite structure is AE. Primarily, research has been conducted with unidirectional layups and have largely disregarded the effects of woven fabrics. Woven fabrics are most commonly used in industry.

AE testing produces information about structural damage by using a sensor to detect transient elastic waves produced within a structure due to sudden redistribution of stored elastic energy. This redistribution could be a result of an external mechanical or pressure load or even a change in temperature. Crack growth, matrix cracking and fiber breakage will all create acoustic events that initiate these elastic waves. The propagating wave may be received by the sensor and converted to electrical signals. Each of these damage events will create a different type of signal. Through analysis of the data, one may be able to differentiate the types of damage occurring within a structure.

AE may be considered a passive NDT technique as it does not require external excitation, unlike other NDT techniques, such as ultrasound, which require an actuator to emit the ultrasonic signal that would then be received by a "receiver". Although it does generally require that the structure being evaluated is under load, normal operating loads will typically suffice. AE can be a very useful technique for analyzing composite structures. The process relies on the interrogation of a purely acoustic signal to obtain relevant data on damage type. Standard acoustic signal types are recognized as "burst" and "continuous" signals. Burst type signals are transient and discrete signals due to a single event. Continuous type signals are generated by a series of burst type events occurring at a high frequency. Continuous AE results in overlapping of the signals and subsequently a featureless plot of amplitude against time is produced. Laboratory tests are typically conducted using burst type emissions, although the application of appropriate filters to continuous signal can isolate certain features and also provide useful information.

Infrared thermography (IRT) is an evaluation technique that may be conducted passively or actively depending on the information required. For the evaluation of structures and materials, information may be acquired by imaging a specimen as its temperature increases under the action of a heat source and then decreases. It is possible to find significant information on a material by increasing the temperature a couple of degrees, in which case it may be considered to be a nondestructive technique. Consequently this technique can be used directly on an aircraft or on a small sample in a laboratory as needed. Monitoring of the temperature decay provides information such as the thermal effusivity and the thermal diffusivity. Both effusivity and diffusivity are thermal properties that are governed by the density, thermal conductivity and specific heat capacity of a material, and therefore vary with different types of fiber reinforced polymers (FRPs). Such properties, alongside properties such as glass transition temperature and Young's modulus, are significantly affected by the cure cycling and cure temperatures and may therefore be used to find information on the resulting strength of the cured material. Another property of thermography is the variance of temperature decay with the number of plies or fiber volume fraction (ratio of fibers to resin in a laminate). Temperature increase and subsequent decay at a reference point on two carbon fiber reinforced specimens are shown in FIG. 1. FIG. 1 also shows the resulting calculated thermal contrast ($\Delta Ta$) between the specimens. The specimens were manufactured to identical thicknesses and fiber and resin specifications and heated over a fixed duration. Specimen Fiber Volume Fraction (FVF), however, was higher in the first specimen, CFRP304. It may be seen from FIG. 1 that CFRP304 increased in temperature more quickly than specimen CFRP302. In other words, a higher carbon FVF results in a higher temperature rise rate.

Combining two of the aforementioned approaches can yield positive results. The utilization of thermography in conjunction with AE is one such pairing that has been shown to provide useful data.

1.2.2 Guided Lamb Waves

Guided waves can exist in the form of Shear, Surface Rayleigh, Surface Love, or Lamb waves. Lamb waves and surface waves are commonly manipulated waves for composites assessment. Lamb waves are the type of waves that occur when the tested component is no more than a few wavelengths thick, whereas surface waves are waves that propagate one wavelength deep. In order to explain how these types of waves may be useful for material identification, it is important to discuss some of the background on them.

Figure 2:
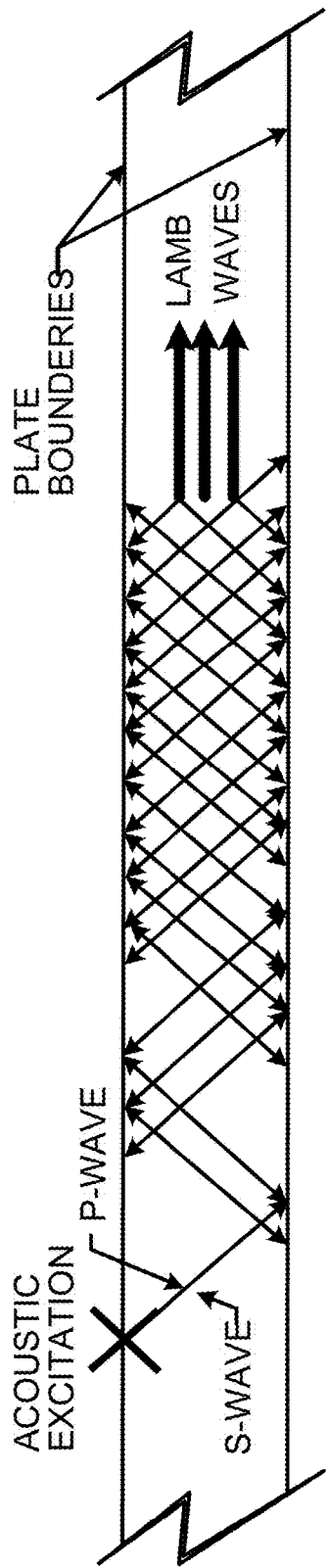
FIG. 2 illustrates lamb wave reflections.

Lamb waves are complex elastic waves that are guided by the boundaries of a thin solid media. Whereas the major types of "solid" waves are longitudinal waves and shear waves, Lamb waves consist of different resonant wave modes, which are a result of the longitudinal and shear waves hitting and reflecting off a surface and each splitting into both longitudinal waves and shear waves. This process repeats every time a longitudinal wave or a shear wave hits a surface, and the interference of the increasing number of waves with each other causes types of resonant wave modes to occur (FIG. 2).

The two most common types of these resonant wave modes are Symmetric (S or extensional) modes and Antisymmetric (A or flexural) modes. These are named as such because they refer to the motion of the wave about the mid-plane of its propagation (illustrated in FIG. 3).

A major benefit of Lamb waves is that they are highly dispersive, and their dispersion characteristics are typically material dependent, i.e., the dispersion curves of a composite laminate will vary depending on their lay-up. As previously described, Lamb waves are a result of interactions between both longitudinal and shear waves. Consequently the properties of Lamb waves are influenced by the properties of these bulk wave types. The velocities of shear waves and longitudinal waves are influenced by a solid material's resistance to the pressure that these waves induce. This relationship is then able to be described in terms of the material's stiffness properties as shown by the following equations:

$$V_L = \sqrt{\frac{E(1-\mu)}{\rho(1+\mu)(1-2\mu)}} \quad (1.5)$$

$$V_S = \sqrt{\frac{E}{2\rho(1+\mu)}} \quad (1.6)$$

Where:
$V_L$=Longitudinal Wave Velocity
$V_S$=Shear Wave Velocity
E=Modulus of Elasticity
$\rho$=Density
$\mu$=Poisson's Ratio Lamb wave features, such as wave velocities, are thus also likely to be influenced by stiffness properties, and so these properties may be obtained by interrogation of the resulting Lamb wave signal. Such information could then help discern the strength of the laminate. Defects will often present as signal discontinuities with respect to features such as amplitude, mode conversion, arrival time.

Surface waves may be categorized as either Rayleigh waves or Love waves and are often associated with seismic theory, describing how waves propagate along the Earth's surface, causing earthquakes. Thus, they are often called seismic waves, where the term seismic specifically relates to vibrations of the Earth and its crust. In the ultrasonic frequency range, however, they can be very useful for non-destructive testing. Surface waves, by definition, travel one wavelength deep in a solid (i.e., along the surface), and have a considerably slower wave speed than body waves or plate waves. This slower wave speed results in a longer decay time, allowing them to travel over larger distances than their body/plate counterparts. While Rayleigh waves cause the particles to travel in the direction of the wave with an elliptical motion, the Love waves cause particles to travel perpendicular to the direction of the wave. Another unique property of surface waves is their ability to travel over curved surfaces and be unaffected by adjacent substructure, in contrast to typical ultrasonic applications. This can be useful when determining the physical properties of more complex composite parts.

1.4 Composites Manufacture

Composites can be manufactured using a wide range of materials and processes depending on what properties are considered to be of highest importance to the manufacturer. Primary factors influencing these decisions are cost, performance (i.e., strength, stiffness, thermal properties, conductivity), and appearance.

Figure 4:
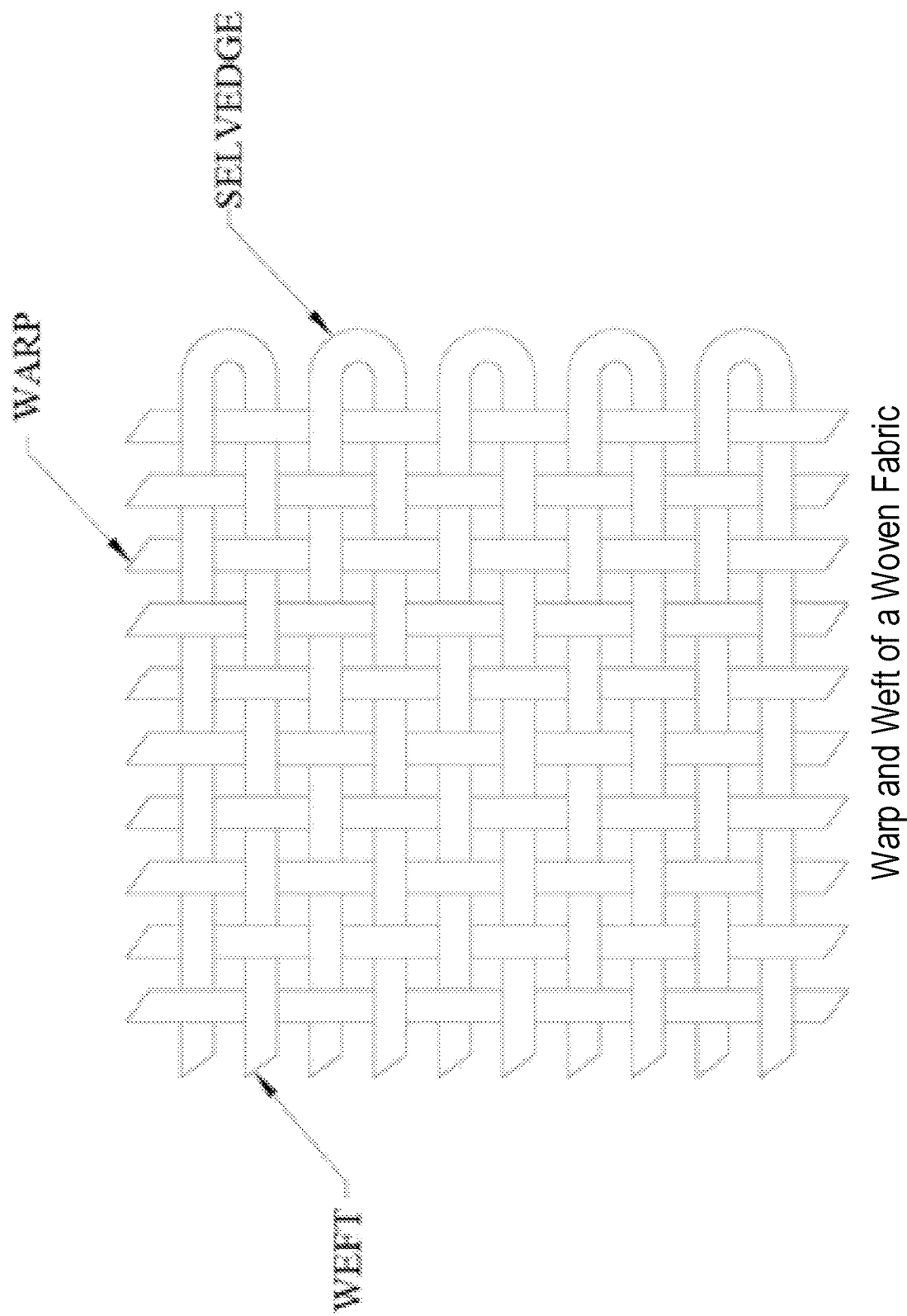
FIG. 4 illustrates a warp and weft of an example woven fabric.

Fiber reinforced polymer composite materials generally fall into three main classes: chopped fiber, unidirectional and woven. Chopped fiber is the least expensive option and, since it has chopped strands which are randomly distributed in all directions, it offers nearly isotropic properties. Chopped fiber composites offer advantages over metals in their weight, ability to conform easily to complex shapes, and corrosion resistance. These advantages make this type of composite reinforcement popular in marine, construction and automotive industries. Chopped fiber mat is typically used in conjunction with hand lay-up and open molding. When superior strength-to-weight ratio is required for applications, designers will often select unidirectional or woven fabrics. Woven fabric is manufactured on a loom and can come in a variety of weave types, tow, and "ends per inch" amongst other parameters. Tow and "ends per inch" refer to related parameters, where "ends per inch" describes the number of "warp" tows per inch of fabric. Less commonly referred to are "picks per inch", which refer to the "weft"/"fill" tows, where warp and weft describe the direction of the tows with respect to how they come off the loom (FIG. 4).

Different types of weaves used in composites draws upon long established techniques of fabric weaving in textiles. Weave types, such as twill and satin, have historically been used for their appearance and drapability (the ability of the fabric to conform to complex shapes when draped over them), particularly in clothing. Plain weave fabrics have been known for their high stability, offering a more uniform surface for screen printing. These weave types have translated into the manufacture of composites, where such properties may also be desirable for the processing of, or within the finished laminated product. The stability of plain weave lends it toward being an easier fabric for workability, particularly with wet lay-ups of composite parts. Twill and satin weaves, on the other hand, are desirable for the manufacture of more complex shapes due to their drapability.

Twill weave is the weave type is generally the most commonly selected due to its drapability, as components in industry are usually complex. Despite this, research into the structural differences between twill and plain weave is sparse, particularly with respect to how these structural differences may affect Structural Health Monitoring (SHM) and NDT techniques for damage assessment. Twill and plain weave are generally accepted by industry as having equivalent properties in strength and stiffness. Crimp, which refers to the severity of undulations caused by weft/fill tows passing over and under the warp tows as the fabric comes off the loom, inherently introduces stress concentrations. These stress concentrations, in turn, reduce the load carrying capability in the direction of the fiber.

When such stress concentrations are cause for concern, designers may prefer to incorporate unidirectional fabric (all fibers are oriented in the same direction), in a cross-ply sequence, with plies oriented at both 0° and 90°, to improve strength and stiffness properties in multiple axes. This makes better use of the inherent properties of the fiber by eliminating crimp-induced stress concentrations, however, it can be difficult to work with due to a lack of stability. The major advantages of the zero crimp aspect of unidirectional fabrics has resulted in techniques and equipment being developed to improve the stability of a unidirectional lay-up. A specific example of this is the fuselage of a Boeing 787, which is manufactured by spinning unidirectional carbon fiber reinforced panel (CFRP) prepreg in multiple directions on a very large mandrel.

Various fibers including Glass, Carbon and Aramid may be used. Sometimes, laminates will consist of a combination of more than one type of fiber. GFRP is the least expensive of these options and often selected when corrosion is of significant concern, for example in marine industry applications. Carbon fiber is usually more expensive than glass, but is selected as a reinforcement when weight is of higher concern as it has a higher strength-to-weight ratio than glass. It is, however electrically conductive, meaning that it can accelerate galvanic corrosion if metallic fasteners are used in conjunction with carbon fiber. In some instances, titanium fasteners are used to minimize galvanic corrosion with metal in contact with carbon fiber. Aramid fiber is most commonly known in the form of the Dupont developed fiber; Kevlar®, and is generally more expensive than glass and carbon type fibers. It is known for its exceptional impact resistance and is often associated with bullet-proof vests and motorcycle protective clothing as a fabric alone. However, when used as a reinforcement for plastics, Aramid fiber can impart those same impact resistive qualities to the resulting composite material. In addition to the different type of material used to make the fibers in FRPs, there are also different processes of polymerization. Polymerization embodies the heating and stretching of the initial powder material through a series of oven stages to create the precursors from which the fibers are spun. These processes can affect the final material properties. Typical aerospace carbon fibers are Polyacrylonitrile (PAN) type fibers, referring to the precursor type for the polymerisation process through which fibers are produced from carbon. PAN type fibers are known for their higher strength, but fibers can also be spun from Pitch type (higher modulus) and Rayon type (industrial grade). When selecting fabrics from a supplier, these are usually referred to by their modulus, as standard, intermediate, or high modulus.

Resins can also be varied to achieve desired properties in the composite. Common resin types include Epoxy, Phenolic, Polyester and Vinyl Ester. However, many other types exist, including Bisphenol based Cyanate Esters, which are known for their toughness, high glass transition temperature and low dielectric constant when compared with other type of resin. The cost of such resin types can often be prohibitive.

Resin types fall into two classes, which are thermosets and thermoplastics, although the most common resin types in transport industry applications are thermosets. Unlike thermoplastics, these cannot be reheated to melt the resin due to permanent cross-linking of the resin molecules. Vinyl Ester and Polyester resins are most commonly used in the marine industry. They are less expensive and offer good resistance to water degradation. Epoxy resins offer superior mechanical properties and are consequently the most widely used in aerospace applications, however phenolic resin use is growing due to fire retardation regulations and the superiority of phenolic resins with respect to fire retardation and temperature resistance. Epoxy resins are also a more expensive resin type and have inherent difficulties associated with processing as they require the addition of a chemical additive known as a hardener to catalyze the reaction that hardens the resin. This requires precise measurements of resin to hardener ratios.

Of processing techniques, hand lay-up is the most basic type, although there exist multiple variations within hand lay-up techniques. Wet lay-up is typically the least expensive option and is carried out by wetting out each ply and "debulking" prior to laying the next ply down. Debulking is the process by which excess resin and air bubbles are squeezed out, and it can be done by either vacuum, or manually with a roller. This removes the excess resin and spreads the resin evenly throughout the ply to avoid resin rich or resin starved areas. Other types of hand lay-up may be done using a preimpregnated composite fabric or tape, which has been subjected to a B-Stage (referring to the incomplete reaction of resin and hardener) partial cure to improve handling. Prepregs, as these are known, are generally more expensive than dry fabric and are commonly required to be kept in a commercial freezer, yet still have a limited time span during which they must be used. They are, however, quite popular thanks to their comparative ease of use and fabric resin saturation consistency. This consistency results in better overall fabric stability and cured laminate mechanical properties.

After a laminate is laid up, it must then undergo curing to harden the resin and create the solid structure. This must typically be done in the presence of a catalyst which can be in the form of heat, pressure, chemical reaction or a combination thereof. Adding of a "hardener" to induce catalysm through chemical reaction can successfully cure composites at room temperature, although heat and pressure are often used to accelerate the process and some chemical catalysts will not react until they reach a certain temperature.

Heat and pressure are most often applied by oven cure under vacuum, by autoclave, or by heat press. Heat blankets or lamps may also be used to accelerate the process, but the application of vacuum or positive pressure aids in expelling any voids that may arise due to off-gassing during the curing process. Heat also offers the advantage of evaporating any solvent or water that may be present prior to cure.

It is imperative to note that heat accelerated curing is not simply a process of heating up and then cooling down of a laminate. Un-stepped heating and cooling could cause residual stresses within the structure. These stresses are a result of any uneven expansion and contraction, and may ultimately cause cracking during the manufacturing process. The "curing cycle" is the term used to describe the process of increasing and decreasing the temperature of an uncured laminate. The temperature is increased incrementally to a maximum value and held at that value for a period of time before being incrementally decreased to room temperature. Sometimes, after this is complete, a post cure may take place to improve laminate properties. The curing cycle is usually prescribed by the resin manufacturer.

Another composite laminating technique that is seeing significant advancements due to increasing popularity is resin infusion. This technique is performed using a closed mold, where the dry fabric laminate is laid up as a "preform" and resin and hardener are injected into the mold under low to moderate pressure. Resins are required to be of very low viscosity to ensure a thorough wetting out of the dry fabric. The benefits of this type of manufacturing technique are the production of high quality (with respect to resin saturation, FVF and dimensional accuracy), and low expense due to the removed requirement of an autoclave. It also maintains similar quality to prepreg manufactured parts, without the need for freezer kept prepreg fabrics.

This section has provided a brief overview of the most common aspects of FRP composite manufacture. Many other manufacturing techniques exist. These techniques include E-Beam, ultraviolet, automated fiber placement/tape laying (the lay-up method previously mentioned for the B787 fuselage), and 3D printing amongst many more. In addition, fiber and resin technology is continuously advancing.

Section 3 Acousto-Ultrasonics

Understanding the effects of the different constituent materials and layup properties of a laminate on its acoustic properties can be difficult to achieve purely by classical ultrasonic techniques. Ultrasonics typically involve exciting a specific frequency, which severely limits the information gathered. Although single frequency excitation may be useful when later attempting to isolate certain wave modes and features, it is imperative to first identify frequency ranges of primary interest. Exciting a broad range of frequencies and identifying the frequency related features that provide the most significant information is useful for development of characterization signatures.

One technique that is often used in ultrasonics to cover a wider range of frequencies is the incorporation of a random pulse generator. This, however, limits the excited frequencies to those contained within the pulse. This is a technique often used for the generation of guided Lamb waves within a structure.

In addition to this, ultrasonic transducers typically operate within a frequency range greater than 1 MHz, which, is much higher than the frequency ranges most readily transmitted by composite materials.

As discussed in above, AE testing operates on the principle of elastic waves being generated as a result of stresses being redistributed within a structure. These elastic waves are generally of lower frequencies than those associated with ultrasonic testing and contain a wider range of frequencies. This method does, however, rely on the stressing of structures to the point that micro-cracks form and start to propagate and, as such, may not be considered truly non-destructive.

The Hsu-Nielsen technique, named after its creators, has since been extensively used, for both isotropic and orthotropic structures. The process to produce the signal is to break a pencil lead against the surface of a test specimen, ensuring the angle and location of the lead at the time of fracture is the same each time. This type of acoustic source has become known as the "Hsu-Nielsen" source with reference to the early experiments conducted by Nielsen and Hsu using pencil lead breaks (PLBs). Current standards specify the use of a 3 mm 2H pencil lead.

Figure 5:
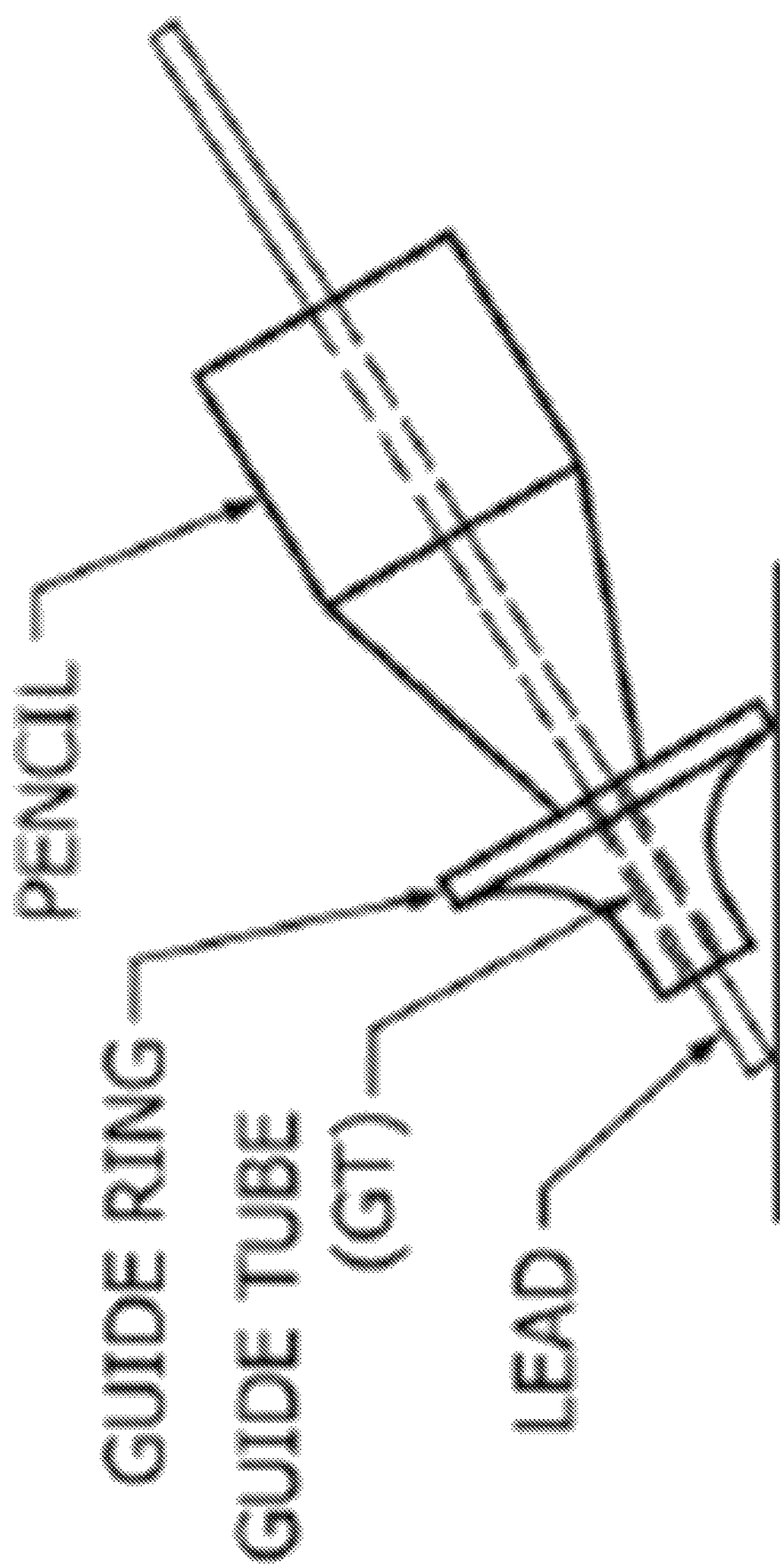
FIG. 5 illustrates a Hsu-Nielsen PLB source.

A standard test set-up is shown in FIG. 5. This set-up uses a type of specialized Teflon guide ring known as a "Nielsen Shoe". The purpose of the guide ring is to aid in the reproducibility of the source by ensuring that the lead is always broken at the same angle. Care must also be taken to ensure that the PLB occurs at the same distance from the sensor each time. This is particularly well established for the calibration of AE sensors and is outlined in ASTM standards. Performing tests in such a manner has also been used in identifying frequency ranges of interest as well as for calculation of wavespeeds through a structure.

PLBs are a method of validating that the test specimen is an appropriate conductor of acoustic signals. PLB can also be used for verifying the appropriate settings, such as gains for the test equipment, to accurately record the signal.

3.2 Acoustic Emissions Testing

Many standards exist that outline the testing techniques for AE testing. ASTM standard E2661 (2018) outlines a procedure for the testing of plate like and flat panel composites using AE.

Simulated acoustic events by Hsu-Nielsen at the surface of a structure creates an elastic wave that propagates through the structure. Excitation in thin plates provides an appropriate range of low frequency longitudinal and shear waves, which will reflect off the boundaries and interact with each other to form Lamb wave modes. It is a simple technique that can provide a significant amount of information on the internal structure.

Section 4 Test Methodologies 4.1 Equipment Used

Testing can be conducted using the Mistras Micro-ii AE system. This system is a PC with a durable exterior, for field applications, and installed data recording software. In addition, the PC carries hardware modifications, including integrated LEDs that light up every time a hit is recorded, and the capability of connecting multiple AE channels via coaxial ports. The preinstalled data recording software is AEWin PCI2 real-time data acquisition and replay, which allows collection of signals and real-time viewing of hits and subsequent features. The interface is highly customizable, allowing the user to focus on real-time monitoring and comparisons of specific features of interest.

Figure 6:
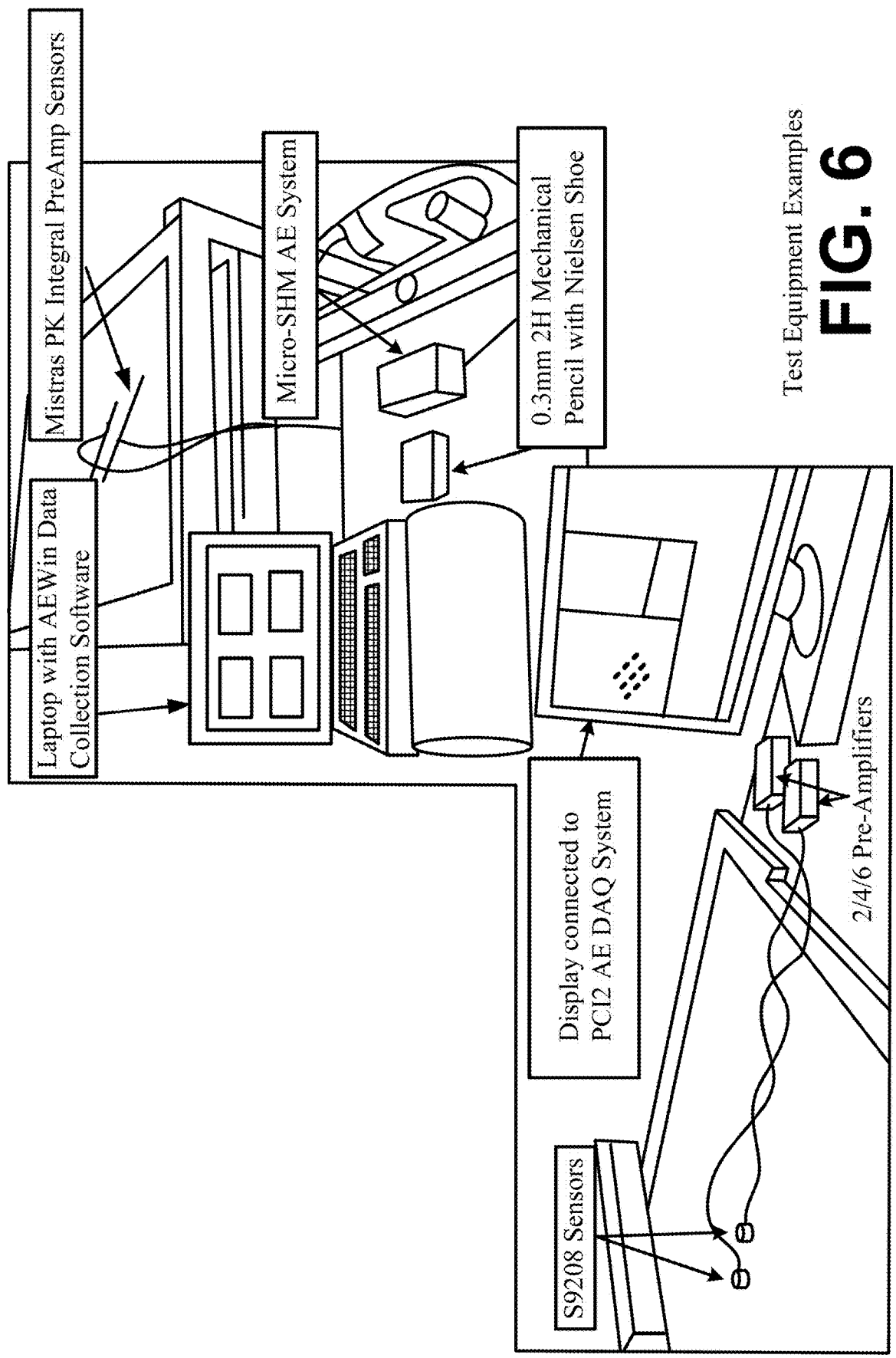
FIG. 6 illustrates example sensor setups for testing composites.

Multiple S9208 Broadband sensors, which are highly accurate across a frequency range of 20-1000 kHz can be used. The S9208 sensor is particularly useful in research applications where frequencies of interest are unknown. In some implementations, more narrowband sensors can be used for specific frequencies. For example, the Mistras PK31, PK61, and PK 151 sensors can be used as a more cost effective alternative. Test equipment examples are shown in FIG. 6.

4.5 Hardware Set Up 4.5.1 Filtering and Sample Rate

The Mistras AEWin monitoring software allows the user the option to select their own sampling rate as well as set up frequency filters and amplitude thresholds prior to data collection. This minimizes the burden of unnecessarily large data sets on storage requirements as well as reduces processing time.

4.5.3.1 Features-Time Domain

Figure 7:
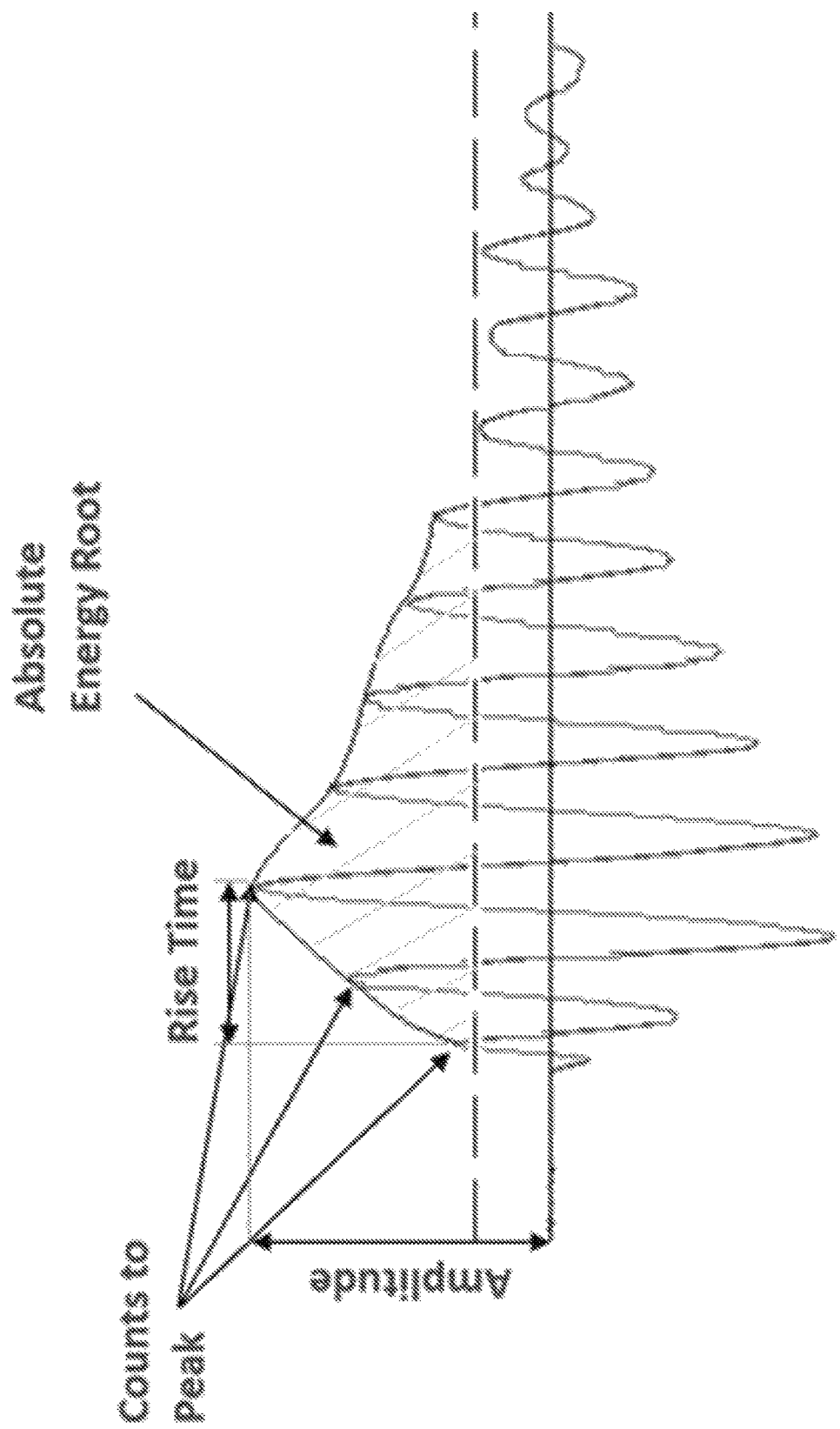
FIG. 7 illustrates important parameters of an acoustic emission waveform.

In the time domain, damage characterization relies on the principle that different types of damage produce different AE "events". Analyzing the waveform allows for a comprehensive review of many features that may be relevant to determining the type of initial failure mechanism in a composite material, for example rise time, duration, amplitude, etc. as shown in FIG. 7. If the intended feature identification technique for testing is hit based then it is important to correctly set the timing parameters 4.5.2.2 Threshold A hit is defined with respect to the selected amplitude threshold. Once a signal crosses this set threshold a hit is recorded.

In addition to the amplitude threshold, it is possible to employ a front-end amplitude filter setting that is useful for reducing unwanted hits from background noise. The value that this parameter is set to defines the threshold over which the peak amplitude should occur and discount any recorded hits that do not reach or exceed this amplitude.

4.5.2.3 Timing Parameters

Timing Parameters are set up prior to conducting tests and include the Peak Definition Time (PDT), the Hit Definition Time (HDT) and the Hit Lockout Time (HLT). Selecting the values of these parameters can ensure data is collected correctly with respect to avoiding spurious measurements and correctly identifying hits and their associated signal features. These values are chosen with respect to the associated material being tested. Example tabulated values of the general recommendations by Mistras for different material types are shown in Table 4.4.

TABLE 4.4

Mistras Recommended Material specific Timing Parameters (microseconds)

| | PDT | HDT | HLT |
|---|---|---|---|
| Composites, Non-Metals | 20-50 | 100-200 | 300 |
| Small Metal Specimens | 300 | 600 | 1000 |
| Metal Structures (high damping) | 300 | 600 | 1000 |
| Metal Structures (low damping) | 1000 | 2000 | 20000 |

Figure 8:
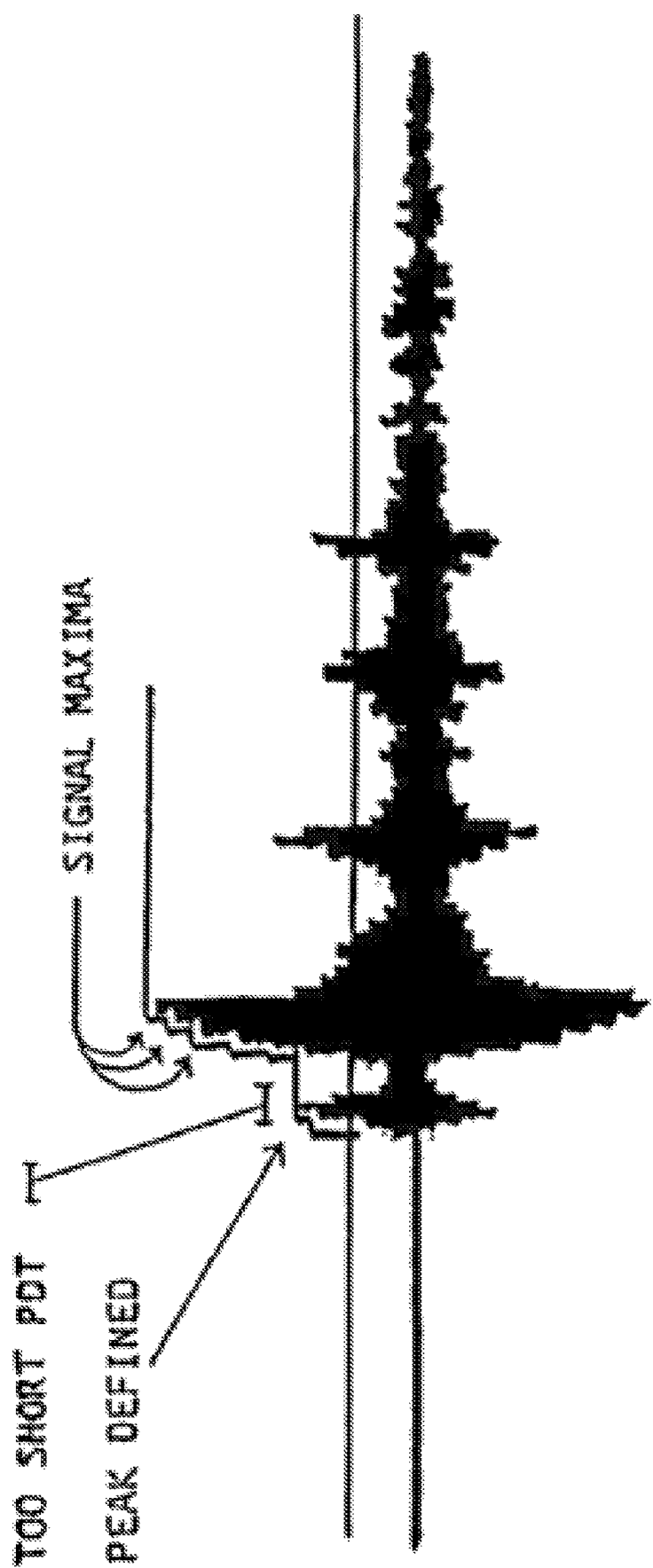
FIG. 8 illustrates a waveform with PDT defined too short.

Application specific definition of the timing parameters requires a further understanding of what each value represents. Peak Definition Time relates to the determination of the "true peak" of a signal waveform. In other words, it is important not to inadvertently define a signal maxima as the peak value of a faster traveling low amplitude component of the signal. Refer to FIG. 8 for pictorial representations of this theory. This setting is particularly relevant when pairing it with a front-end amplitude threshold filter. An incorrect setting could define the peak amplitude of the signal at the early arrival, lower amplitude part of the signal and may result in a relevant hit not being counted. It is also important not to set the value of the PDT too high, as this too can result in false measurements of the peak amplitude. Suggestions for selection of the value for the PDT (MISTRAS) are to calculate from PDT=D/C, where D is the sensor distance and C is the speed of the fastest wave.

For initial propagation tests, this was calculated to be 30 microseconds using the S0 wave mode speeds from group velocity dispersion curves, which aligns with the Mistras recommendations. This could then be modified subsequent to actual data being collected using the Hsu-Nielsen technique and adjusting the value higher or lower with respect to the continuity of the signal peak amplitude.

HDT may be utilized to remove the effects of reflections from structural boundaries, i.e., edge reflections in a plate. This is achieved by defining the maximum time between threshold crossings such that, if the amount of time defined has elapsed and another threshold crossing occurs, this would not be counted as part of the hit. Whether it is counted as a separate hit is defined by the HLT, thus these two values are often selected with respect to one another. For the initial purposes of this study it was imperative to include all such data on edge reflections and other later signal information, to obtain all relevant aspects of the signal. Thus the recommendation to keep the HDT as relatively long can be followed.

Suggestions for selection of the value for the HDT (Mistras) are to calculate from HDT=L/C, where L is the characteristic length and C is the speed of a typical main wave, or 20/AC where A is the measured attenuation coefficient (dB/mm). The smaller value of the two is the most appropriate, although it is recommended to be at least twice the length of the PDT.

Figure 9:
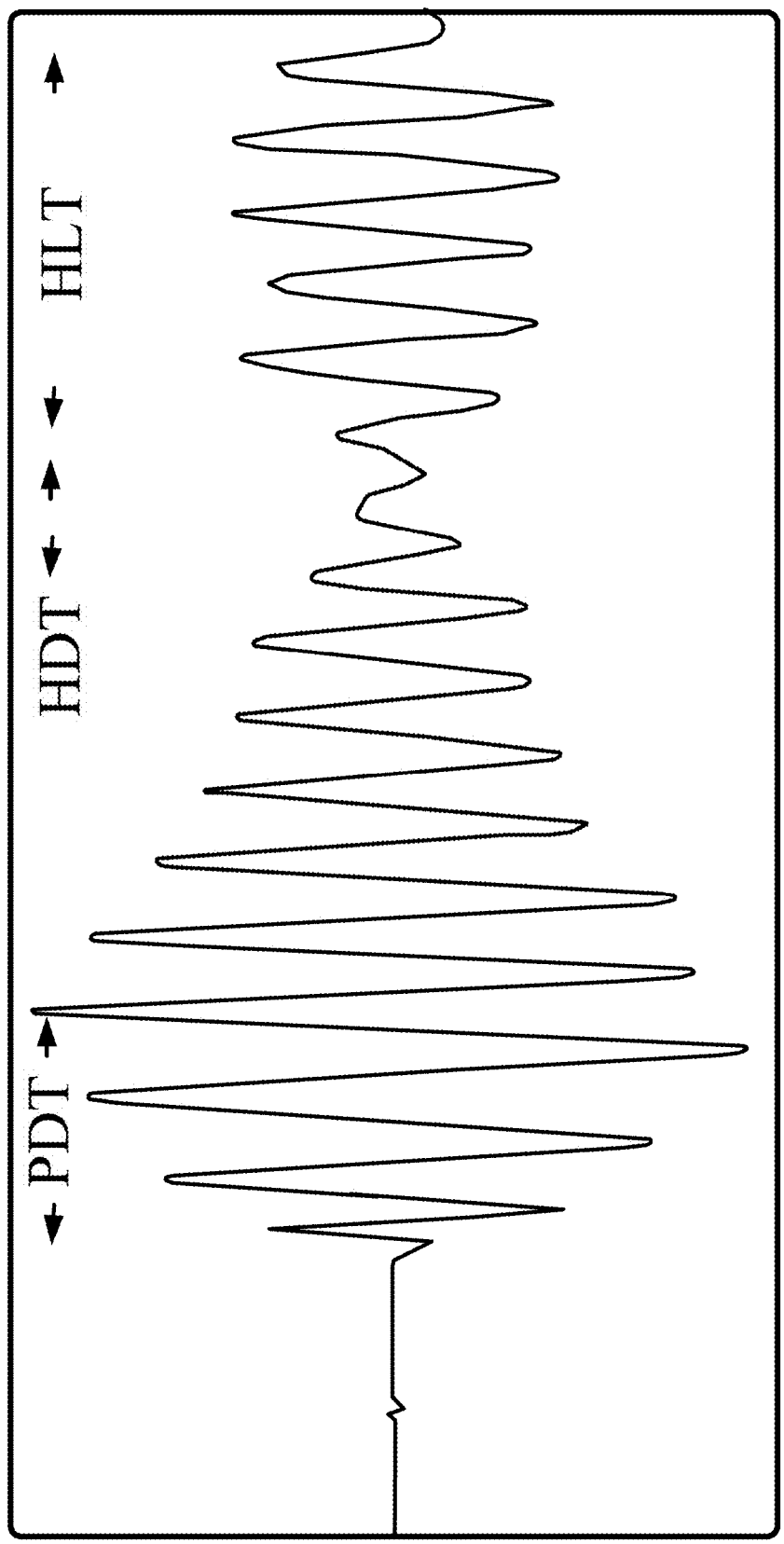
FIG. 9 illustrates an example waveform with good timing parameter settings.

HLT, as described previously, is relevant to the detection of the next hit, once the previous hit has ended. Defining this too low may result in reflections and other later components of the previous hit being recorded as a separate hit, should the HDT be defined short enough to remove these threshold crossing components from the original hit. If the HDT has been set high enough to allow for all the late arriving signal components to be recorded as part of the original hit then the HLT should be set as low as the system will allow in classic acoustic emission scenarios, otherwise relevant hits occurring soon after the original hit may not be recorded. One example of appropriate timing parameter settings is shown in FIG. 9. Settings defined in this way would remove any edge reflections from the definition of the hit and prevent them from being recorded as separate hits.

It is important to note that with single AE burst induced signals, reducing the times associated with HDT and HLT are not as critical as with SHM applications or monitoring techniques. The latter applications may result in many acoustic events occurring within a short time span of each other. Therefore, in the event of simultaneous AE and thermography testing, it is imperative to reduce the HDT values from those associated with the propagation studies and subsequent induced Lamb wave studies, and increase HLT values to avoid reflections and noise being counted as "hits". For this research the following hit determination and feature definition parameters for Hsu-Nielsen tests were selected based on collected calibration data: PDT-60 μs, HDT-100, μs HLT-10-1000 μs, Amplitude Threshold-60 dB.

However, one of the primary intents of performing calibration tests using the Hsu-Nielsen technique in industry is to adjust the timing parameters and thresholds appropriately for the material under investigation. Considering that there is not a "one size fits all" group of settings that would cover all the different materials and lay-ups involved in this investigation, the settings defined above can be the base settings for all tests. Settings can be then adjusted from the base settings, as different composite structures require.

4.6 Coupling

A good coupling of two surfaces assists in obtaining accurate information on the acoustic signals propagating through the structure. Most surfaces have some amount of roughness to them which allows air gaps to exist between a sensor and a test specimen. The significantly lower acoustic impedance of air with respect to the coupling surface mediums is undesirable for transmission of the very low frequency signals involved in AE testing. Introduction of a semi-viscous couplant layer, with a higher acoustic impedance that is closer to that of the coupling surface mediums, can fill in these air gaps by displacing the air, which can improve the sensitivity response of the sensors. ASTM standards discuss the importance of a good couplant and give recommendations on factors such as the thickness, viscosity, impedance and absorption, all of which factor into the transmission effectiveness of the coupling layer.

Sonotech Ultragel 2 can be used as a couplant and to provide coupling action between the transducer and specimen, with an acoustic impedance about 4 times that of air (1.8+0.05 MRayls) and good viscosity (~80,000 cps). Hot melt glue is popular for bonding the sensor to the surface of complex shapes, especially on metallic structures. For on-site reviews of aircraft, it is important to ensure that no inadvertent damage is precipitated and no residue is left behind. Beeswax offers a good alternative for temporary structural adhesion and it does not require as much heat to mold and is easy to remove. Beeswax provides sufficient coupling and adhesion properties (Acoustic Impedance 2.23 MRayls), and has seen significant use in AE research.

Section 5 Testing and Analysis

5.1 Wavespeeds

5.1.1 Wavespeed Determination

Calculation of wavespeed is an important part of the process by which flaws may be located by AE testing. The flaw location is determined by triangulation, whereby the distance between the acoustic event, originating at the flaw, and a number of sensors in a network is calculated. Calculation of this distance relies on a known velocity of the elastic wave through the structure. Since the velocity of an elastic wave through a solid material is dependent on the elastic constants and the density (with reference to Equation 5.1), this wavespeed value will vary between different wave propagation media.

Figure 10:
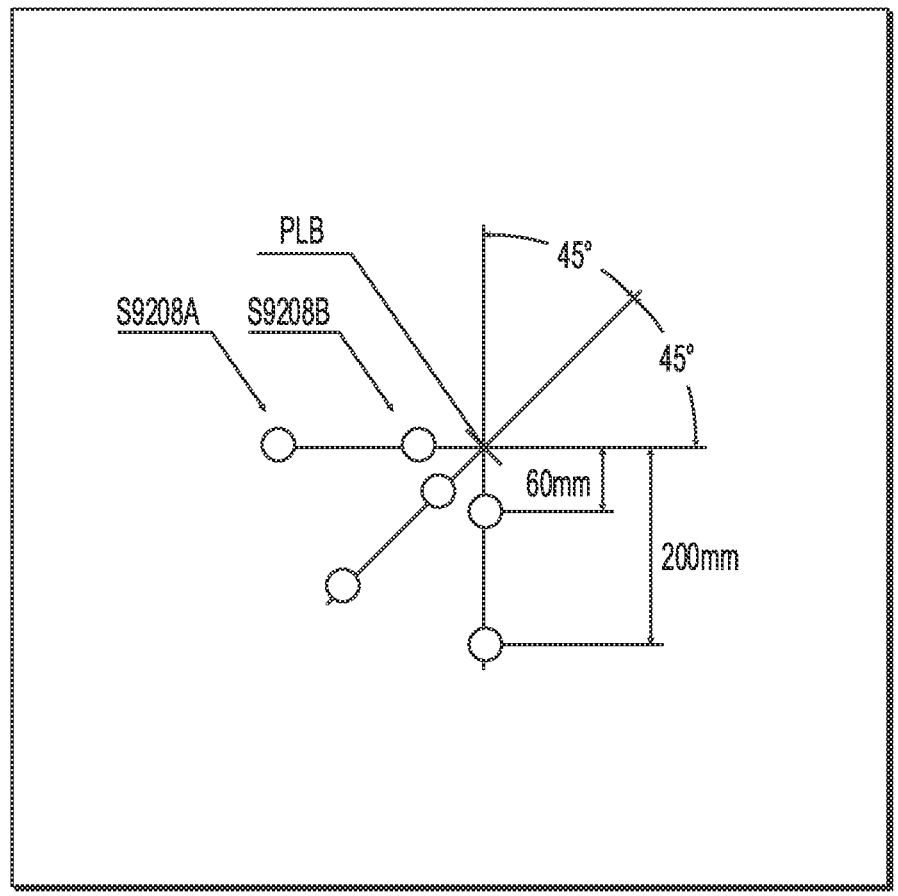
FIG. 10 illustrates an example sensor setup for wavespeed calculations.

One example method used for wavespeed calculation is displayed in FIG. 10. The two S9208 sensors are positioned to allow sufficient distance for the Lamb wave modes to have fully formed before reaching the first sensor, as determined experimentally (refer to section 5.5).

In one embodiment of the invention, ten PLBs performed at the surface and repeated at angles of 0°, 45° and 90° with respect to the laminate 0° axis. The wavespeed for each angle is then calculated from the time for the threshold to be crossed at each sensor using the formula:

$$V_W = \frac{T_A - T_B}{D} \quad (5.1)$$

Where:

$T_A$=Time of threshold crossing at sensor A
$T_B$=Time of threshold crossing at sensor B
D=distance between the sensors

5.1.2 Wavespeeds

The wavespeeds are then averaged from the ten PLBs to provide a value for each angle. This process was followed for twelve specimens. The results of testing are listed in Table 5.1.

TABLE 5.1

Average Wavespeeds

| Panel | 0° speed(m/s) | 45° speed(m/s) | 90° speed(m/s) | 0 to 45 ratio |
|---|---|---|---|---|
| 1 | 5852 | 4246 | 6743 | 1.38 |
| 2 | 5432 | 3613 | 5870 | 1.50 |
| 3 | 5680 | 5000 | 5119 | 1.14 |
| 4 | 5283 | 4934 | 5076 | 1.04 |
| 5 | 5187 | 5243 | 5283 | 1.01 |
| 6 | 6264 | 4390 | 6429 | 1.43 |
| 7 | 5902 | 3613 | 6298 | 1.65 |
| 8 | 6393 | 1440 | 6667 | 4.44 |
| 9 | 5956 | 1189 | 5870 | 4.87 |
| 10 | 3862 | 3549 | 3784 | 1.09 |
| 11 | 5400 | 5416 | 5374 | 1.00 |
| 12 | 5894 | 4133 | 5425 | 1.40 |

Notable differences in overall wavespeed values can be observed between panels consisting of different fibers. Table 5.1 shows considerably lower velocities in all directions for the GFRP panels compared to the CFRP panels.

In addition to the large wavespeed discrepancies with respect to fiber type in composites, the presence of variations in wavespeed with propagation angle appears to carry significant information about the laminates. It is apparent that in plain weave specimens, particularly with a stacking sequence of $[0]_{16}$, the velocity is significantly slower along the 45° propagation angle. This decrease in velocity becomes exaggerated when the resin saturation deviates from standard.

Figure 11:
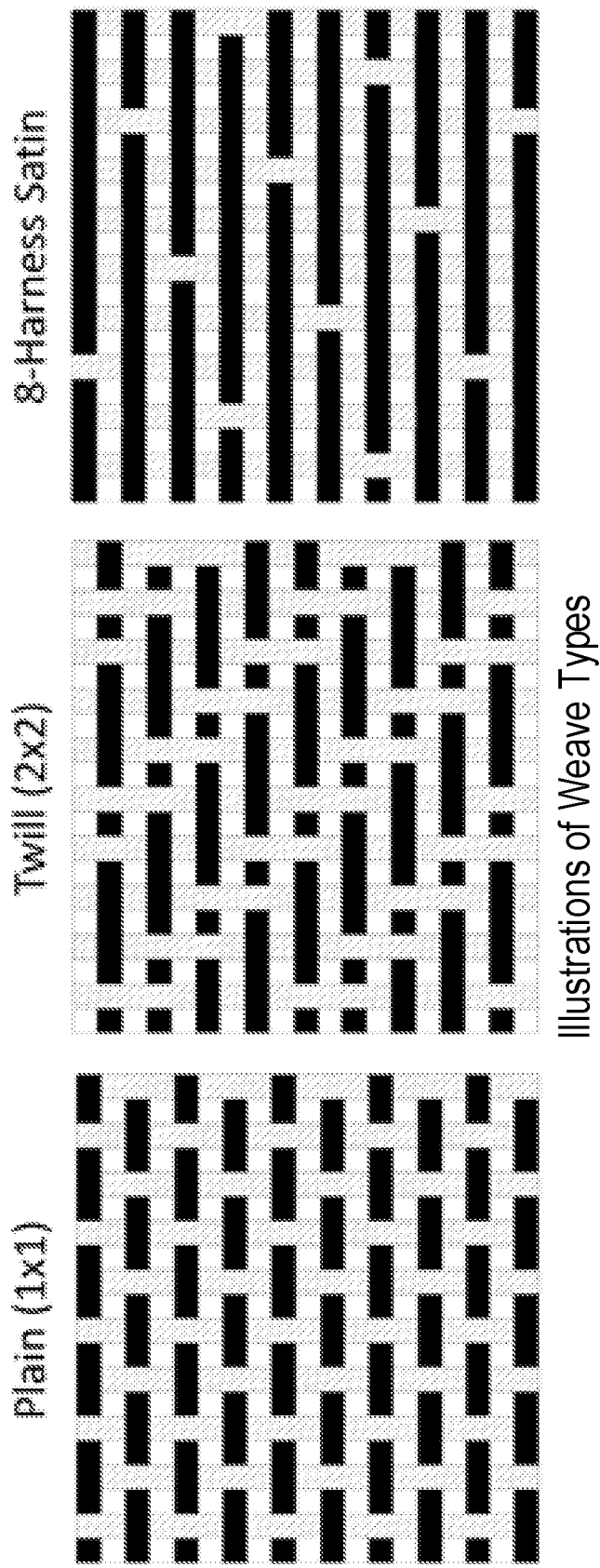
FIG. 11 illustrates example weave types.

Different weave types resulted in a slightly different wavespeed being observed for the Twill specimen (Panel 11) along the 45° axis than for the Plain Weave specimen of identical stacking sequence (Panel 4). With reference to FIG. 11, this velocity discrepancy may be attributed to a greater amount of time for the sound wave to travel through the resin instead of the fiber, which has a lower speed of sound. As the elastic wave travels along the 45° angle, it encounters gaps between tows, more so than along the 90° and 0° angles. In a laminate of standard saturation, the gap between tows is filled with resin which aids in transferring the elastic waves between tows. The wavespeed of epoxy resin is, however, much less than that of carbon fibers and consequently the elastic wave travels more slowly through these gaps, thus causing a lower overall wavespeed along the 45° angle.

Both the resin starved and the resin rich panels carry much lower velocities in the 45° propagation angle versus the standard saturation panel. This may be explained by the travel of the elastic waves between fibers with reference to FIG. 12.

Figure 12:
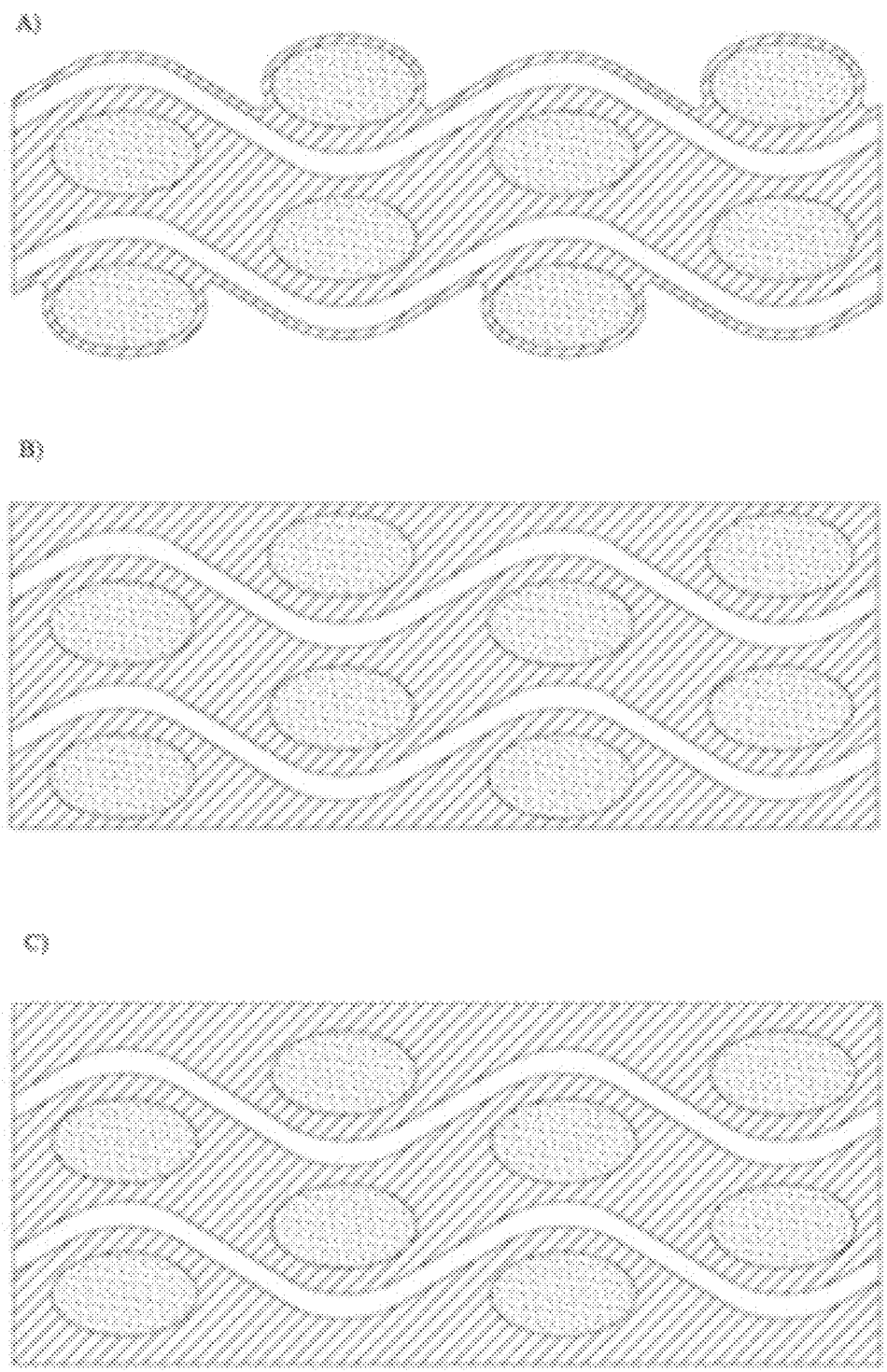
FIG. 12 illustrates example cross sections of laminates with various resin saturations.

FIG. 12 shows an exaggerated version of how the woven fabric may appear in order to highlight the reasons for resin saturation effects on speed. FIG. 12 presents a section view of five plies of the laminate as it may appear for the different resin saturations. When the laminate is resin rich the elastic wave propagation through the laminate must travel through a greater amount of resin before returning to the fibers, further slowing the wave. Resin starvation, on the other hand, will often result in microscopic pockets of air or vacuum (voids) throughout the laminate. This results in the elastic wave being forced to propagate between resin to air (or vacuum) interfaces as well as through carbon fiber to resin interfaces. Since the speed of sound is slower through air than resin, this again causes a significant retardation of the wave.

5.2 Waveforms

The waveforms of the signals along the 0° propagation direction vary significantly in both shape of the first arrival and the subsequent reflections.

Figure 13:
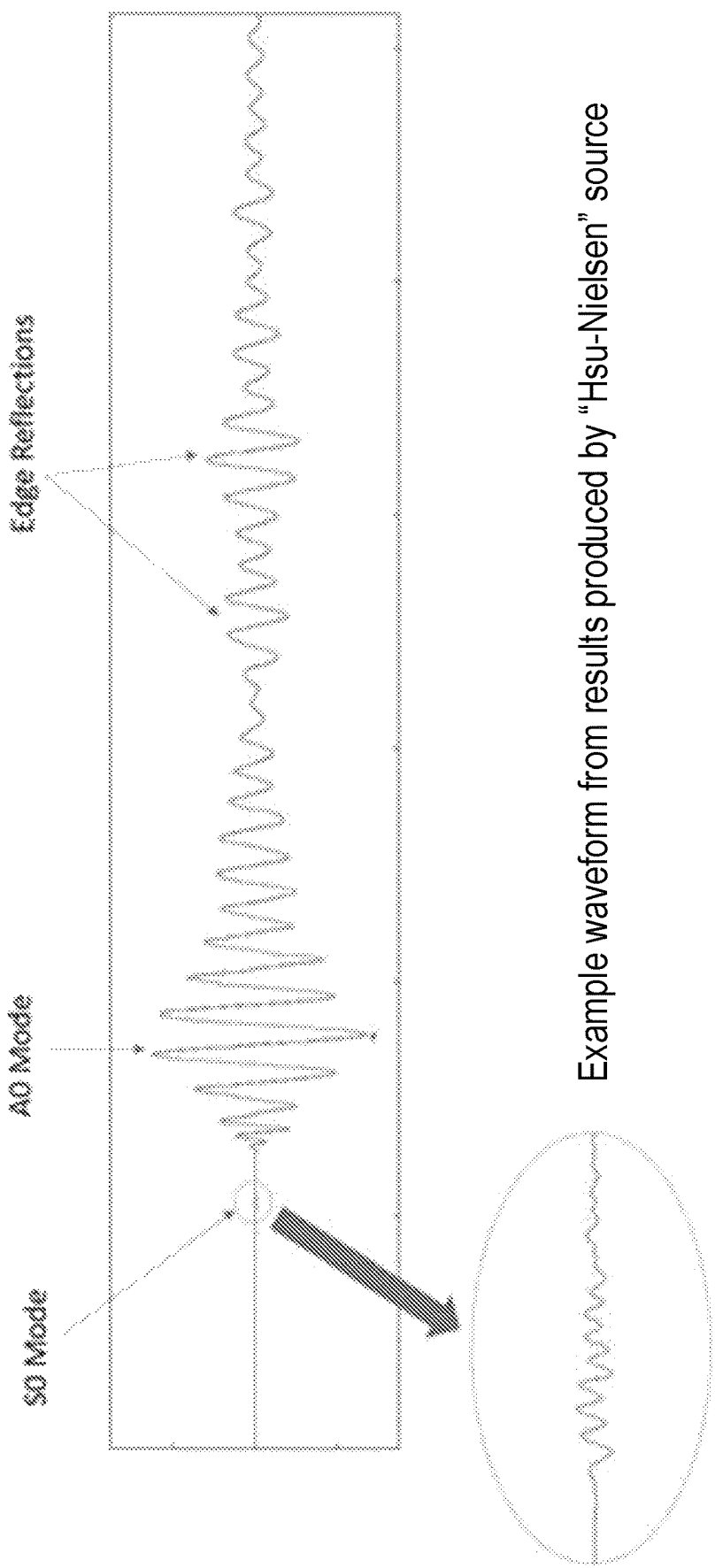
FIG. 13 illustrates an example waveform produced by a Hsu-Nielson source.

The signals themselves can be observed to consist of an early arriving, low amplitude, high frequency mode, followed by a high amplitude, low frequency, later arriving mode (FIG. 13). This is indicative of the presence of Lamb wave modes. The low amplitude component of the signal corresponds with the S0 mode in Lamb wave mode types and usually travels faster than the A0 mode due to its tendency toward in-plane propagation.

For several specimens, such as the Twill, Cyanate Ester and Resin Rich panels, it can be observed that multiple, strong reflections are present for high frequency components of the signals. With respect to prior wavespeed calculations during a preliminary edge reflection study, these reflections would not be caused by the plate boundaries. Although these reflections exist in the remaining panels, they appear to be quickly attenuated.

Analysis of the waveforms show useful variations between panels at each angle. Although the panel sizes were selected to minimize edge reflection effects, there were still some of these reflections present in the later portions of the signals. Observation of the waveforms for each of the panels also shows that many significant variations occur prior to the signal peak. Consequently, relevant features chosen for comparison were those ignoring the effects of edge reflections, such as risetime, counts to peak and amplitude.

5.3 Time-Domain Features

The AE technique sometimes relies on hit-based features that are calculated with respect to user-set parameters in amplitude threshold and timing. This form of data reduction is particularly useful for shorter pulses within signals as opposed to the continuous nature of a large body of AE testing.

Once the signals were collected, hit-based features can be averaged. These features are displayed in Table 5.2 for several example panels. Differences can be seen between the panels, especially with respect to absolutely energy, rise time and counts to peak. Since edge reflections are present, focus is primarily on the features present in the initial part of the signal, such as counts to peak and rise time, although absolute energy did show some promising trends and is therefore also discussed.

TABLE 5.2

Hit-Based Feature Comparison

| Panel | Risetime | Counts to Peak | Initiation Frequency | Abs Energy |
|---|---|---|---|---|
| 1 | 76 | 4.0 | 41 | 1.1E+07 |
| 2 | 61 | 2.8 | 47 | 4.9E+06 |
| 3 | 108 | 4.1 | 39 | 3.1E+06 |
| 4 | 83 | 4.0 | 49 | 4.7E+06 |
| 5 | 78 | 3.0 | 38 | 6.2E+06 |
| 6 | 139 | 4.9 | 36 | 9.0E+06 |
| 7 | 125 | 4.0 | 33 | 7.6E+06 |
| 8 | 162 | 5.3 | 33 | 1.8E+07 |
| 9 | 144 | 4.7 | 33 | 7.2E+06 |
| 10 | 121 | 5.0 | 42 | 8.5E+06 |
| 11 | 66 | 3.0 | 48 | 4.6E+06 |
| 12 | 138 | 5.0 | 37 | 1.5E+07 |

5.3.1 Initiation Frequency
5.3.1.1 Initiation Frequency

With reference back to FIG. 7, several of the features specifically deal with initial portions of the signal. These features, listed in Table 5.2, create a useful picture of the initial waveform shape in each of the panels, particularly when observing the features with respect to each other. It may be noted that several of the panels, for example panels 10 and 11, while having an equivalent or even greater rise time when compared with other panels (9 and 6) are shown to have a lower number of counts to peak. The relationship between counts to peak and rise time exists as a feature in the AEWin data processing software as "Initiation Frequency". Initiation frequency, often called the "risetime frequency", is the counts to peak divided by the risetime. The AEWin calculated values for initiation frequency are listed in Table 5.3.

Different orientations of the top and bottom plies have a sizable affect on the values in all propagation directions. This is represented by a direct comparison of panels 4 and 11 to panels 5 through 10 and 12. Although panels 4, 5 and 11 all consist of the same number of plies orientated at the same angles, symmetric panel 5 initiation frequencies are identical in the 0° and 90° directions, whereas the other two panels display a noticeable skew, turning away from the 0°.

TABLE 5.3

Average Initiation Frequencies

| | Test Angle w.r.t. Laminate 0° | | |
|---|---|---|---|
| Panel | 0° | 45° | 90° |
| 1 | 41 | 52 | 34 |
| 2 | 47 | 35 | 45 |
| 3 | 39 | 43 | 30 |
| 4 | 49 | 43 | 37 |
| 5 | 38 | 47 | 38 |
| 6 | 36 | 40 | 32 |
| 7 | 33 | 39 | 31 |
| 8 | 33 | 42 | 34 |
| 9 | 33 | 34 | 34 |
| 10 | 42 | 45 | 43 |
| 11 | 48 | 46 | 40 |
| 12 | 37 | 37 | 37 |

5.3.2 Absolute Energy
5.3.2.1 Absolute Energy

Absolute Energy, with reference back to FIG. 7, is defined as the area under the square of the curve of the "hit", above the threshold. This means that it describes the overall energy of that waveform packet as it reaches the sensor without the noise floor. Unlike the hit-based features discussed prior, this feature relies on the definition of the entire hit. Considering potential effects of edge reflections, this may not always be an appropriate feature for the intended applications as field testing will rarely be on large, flat panels. Relationships exist between the symmetry of the laminate and the Absolute Energy, as well as with the overall dominant orientations of fiber. Higher values correspond, generally, with high numbers of fibers oriented in the same direction as the measured wave propagation.

TABLE 5.4

Average Absolute Energies

| | Test Angle w.r.t. Laminate 0° | | |
|---|---|---|---|
| Panel | 0° | 4.5° | 90° |
| 1 | 1.1E+07 | 3.7E+06 | 1.1E+07 |
| 2 | 4.9E+06 | 2.0E+06 | 4.0E+06 |
| 3 | 3.1E+06 | 4.0E+06 | 4.0E+06 |
| 4 | 4.7E+06 | 6.3E+06 | 2.3E+06 |
| 5 | 6.2E+06 | 5.4E+06 | 4.9E+06 |
| 6 | 9.0E+06 | 5.3E+06 | 1.2E+07 |
| 7 | 7.6E+06 | 1.5E+06 | 7.1E+06 |
| 8 | 1.8E+07 | 5.0E+06 | 1.8E+07 |
| 9 | 7.2E+06 | 4.0E+06 | 9.6E+06 |
| 10 | 8.5E+06 | 4.4E+06 | 6.1E+06 |
| 11 | 4.6E+06 | 4.7E+06 | 4.4E+06 |
| 12 | 1.5E+07 | 6.0E+06 | 1.4E+07 |

The highest value discrepancies correlate with the resin, both regarding saturation and type. The resin starved panel produces values more than 1.5 times a panel having the equivalent stacking sequence with normal saturation, while the Cyanate Ester panel produces values closer to twice that of equivalent epoxy resin panels.

5.4 Time-Frequency Domain
5.4.1 Frequency and Time-Frequency Domain Analysis

In addition to looking at waveform features, as discussed above, it can be useful to transform a signal into another domain to identify additional features, such as frequency components. A more thorough inspection of the high frequency reflections as well as antisymmetric and symmetric mode discrepancies is possible by transforming the signals into the time-frequency domain. This allows us to identify the frequency ranges of interest at arrival of the wave modes by investigating frequency changes over time. A group of transform equations called "wavelet" transforms are applied to assess the signals in the time-frequency domain. Wavelet transforms are similar in theory to the FFT in that they allow us to break up a signal into components of frequency. However, wavelet transforms go one step further by adding in a temporal function. Whereas an FFT breaks up a signal into constituent sinusoidal waves of different frequencies, wavelet transforms operate by applying a user-selected "mother wavelet" to a signal and assessing the stretch and compression of it over the duration of the signal.

Certain tools, such as MATLAB's built in "Wavelet Analyzer" app allows the user to choose from a selection of several types of wavelet, and MATLAB further allows the user to create their own wavelet to suit the purposes of their signal processing. A popular wavelet type in AE and Lamb wave analysis is the Morlet wavelet. The Morlet wavelet is a Gaussian windowed complex sinusoid. The wavelet derivation is explained in greater detail by and described in both time and frequency domains as follows:

$$\psi_M(t) = \frac{1}{\sqrt{\pi \omega_b}} e^{i 2\pi \omega_c i} e^{-\frac{t^2}{\omega_b}} \quad (5.2)$$

$$\psi_M(\omega) = e^{\pi^2 \omega_b (\omega - \omega_c)^2} \quad (5.3)$$

Where:
$\psi_M$=Morlet Wavelet
$\omega_b$=Bandwidth
$\omega_c$=Center Frequency

Comparison of both FFT and Morlet wavelet plots for the exact same signal further support the requirement for the use of the Morlet Transform. The circled area in the FFT plot would most probably be discounted during signal analysis. In the time frequency domain, however, the circled region corresponding to these frequencies (shown if FIG. 13) can be observed to be a visible part of the signal. This region is important in that it corresponds to the arrival of the symmetric mode.

5.4.2 Frequencies of Interest

Dominant frequencies can be observed in three major regions. These regions have been identified across all twelve panels from the scalograms and are consistent. The ranges encompassing the signals are listed in Table 5.5 for propagation along the 0° axis of the panels.

TABLE 5.5

| Frequency Ranges | | |
|---|---|---|
| Region 1 (kHz) | Region 2 (kHz) | Region 3 (kHz) |
| 20-30 (A0) | 75-120 (A0) | 170-625 (S0) |

5.4.3.1 Stacking Sequence

Figure 14:
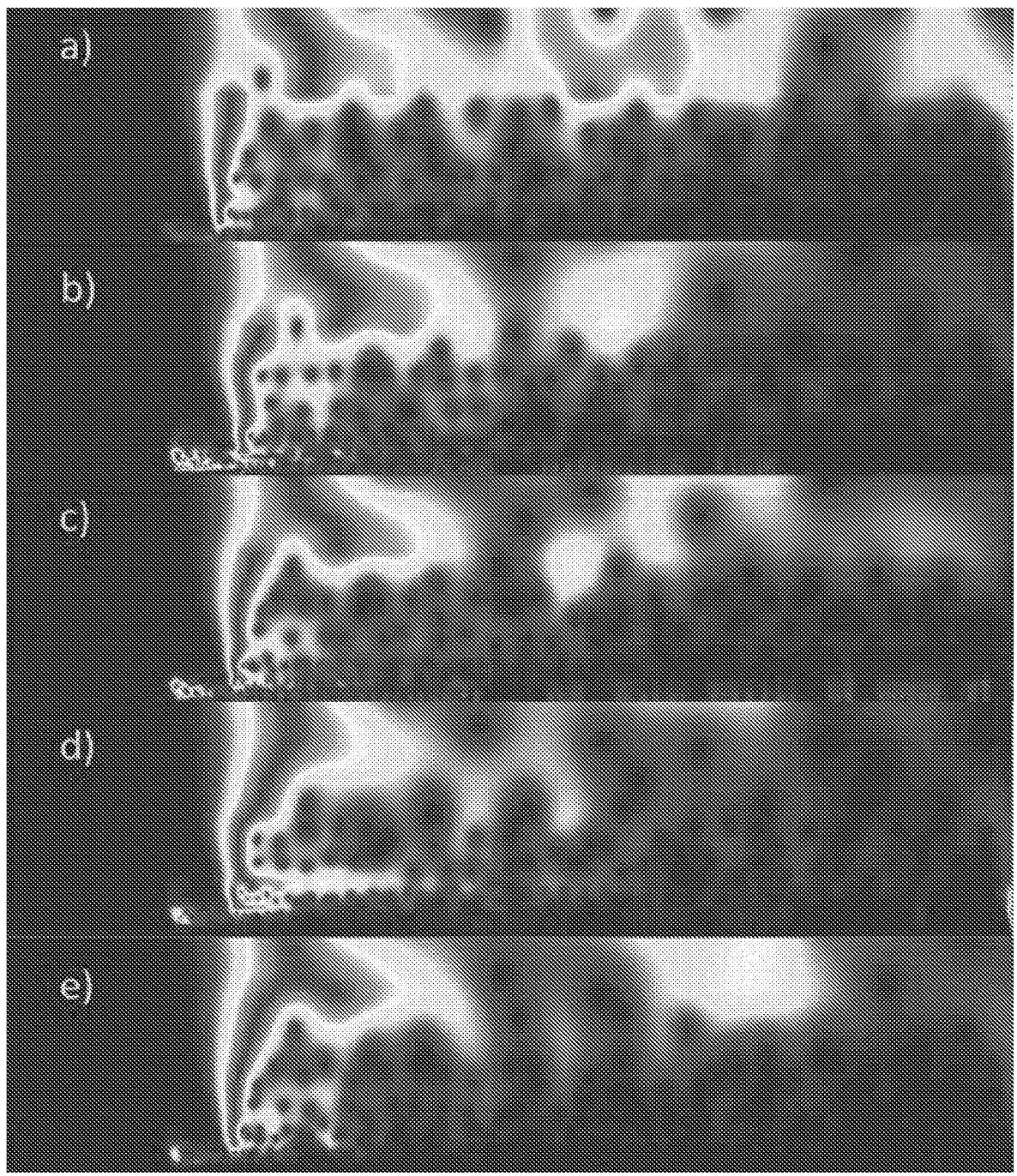
FIG. 14 illustrates example scalograms for several tested panels.

Examination of scalograms for the five different stacking sequences in FIG. 14 initially highlights a small separation of the two A0 mode frequency ranges. This separation can be found, with respect to time, for propagation along the 0° axis when each ply has fibers orientated in the same direction as the wave propagation.

Also noted are the variances in the wavelet coefficients for the S0 mode arrival with respect to the A0 mode arrival across the different panels. Maximum values of the coefficient moduli at the arrival of the two fundamental Lamb wave modes were determined and are listed in Table 5.6 for propagation angles of 0°, 45° and 90°. The ratio of the coefficients at each angle are presented in Table 5.6.

TABLE 5.6

Stacking Sequence A0 and S0 Wavelet Coefficients

| Panel | 0° S0 | 45° S0 | 90° S0 | 0° A0 | 45° A0 | 90° A0 | S0/A0 Coefficient Ratio | | |
|---|---|---|---|---|---|---|---|---|---|
| | | | | | | | 0° | 45° | 90° |
| 1 | 0.222 | 0.033 | 0.305 | 38.6 | 14.8 | 34.6 | 147.1 | 444.7 | 114.4 |
| 2 | 0.086 | 0.026 | 0.118 | 23.1 | 14.2 | 20.4 | 273.6 | 552.3 | 174.1 |
| 3 | 0.069 | 0.083 | 0.06 | 18 | 19.3 | 18.2 | 271.3 | 234.2 | 304.4 |
| 4 | 0.038 | 0.021 | 0.063 | 22.9 | 20.9 | 14.9 | 488.5 | 505.3 | 244 |
| 5 | 0.106 | 0.096 | 0.1 | 23 | 20.1 | 24.8 | 218.8 | 209.5 | 248.2 |

Figure 3:
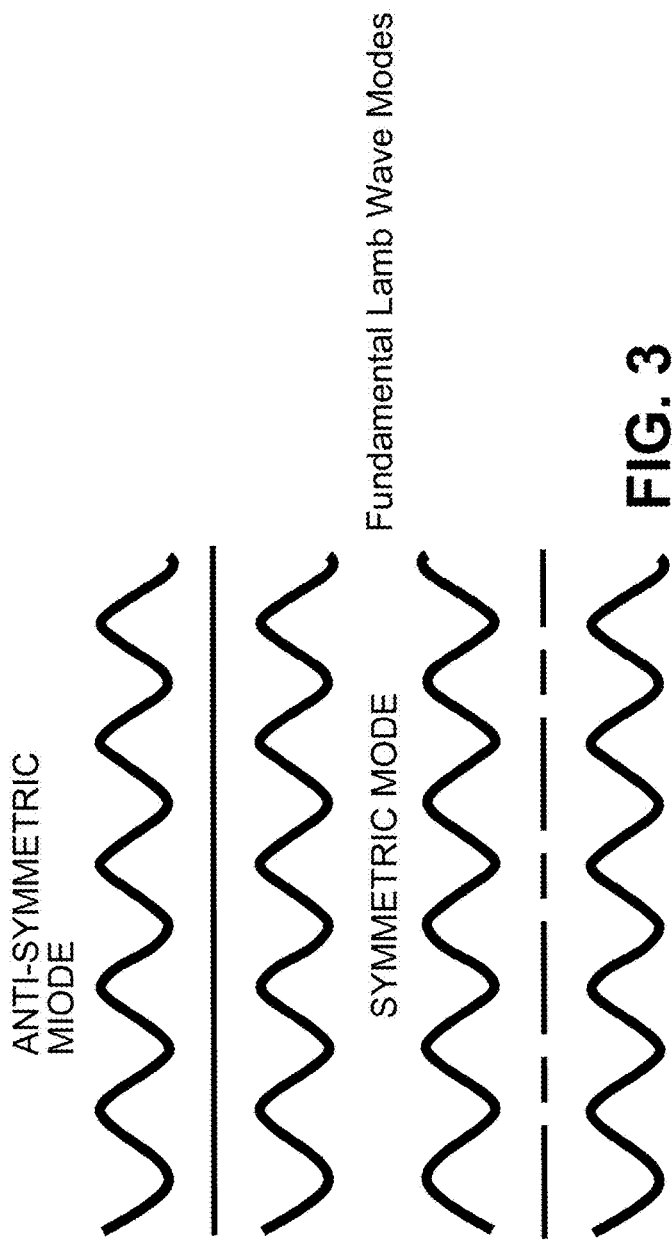
FIG. 3 illustrates the fundamental lamb wave modes.

With reference to the coefficient ratios, laminate symmetry is of significance, as the ratios for panels 4 and 5 show large discrepancies, despite having an equal number of plies oriented in the same direction. The influence of the extensional stiffness was found to be primarily on the S0 mode and the influence of the bending stiffness was found to be primarily on the A0 mode. The symmetric and anti-symmetric modes are also commonly known as the extensional and flexural modes due to their respective in-plane and out-of-plane propagation characteristics (FIG. 3).

In industry laminates will often be laid up to be symmetric about the mid-plane in order to try removing the coupling between the bending and extensional stiffnesses. This is known as a symmetric lay-up and results in all values in the [B] matrix being reduced to zero. This simplifies analysis while also preventing twisting/warpage from thermal loads. The specific example of panel 5 is known as a quasi-isotropic laminate, implying that the [A] matrix acts like that of an isotropic material, further reducing the number of independent constants. Although panel 4 has the exact same number of plies in the same orientations as panel 5, it is not symmetric. The non-symmetry about the mid-plane of the test panels is often undesirable as it can result in warpage of the panel during curing. However, occasionally non-symmetric laminates may be desirable. Designers have used this warpage to their advantage to intentionally design a lay-up that would create thermally induced multi-stable laminates. This type of lay-up, however, results in non-zero values existing in the [B] matrix.

Accounting for this coupling of bending and extensional modes, the two panels would theoretically have equivalent extensional stiffnesses but different flexural stiffnesses. These theoretical values were calculated and are presented in Table 5.7. Thus the relationships between extensional and flexural mode energies appear to correlate with the relationships between the extensional stiffness and flexural stiffness.

TABLE 5.7

Theoretical Stiffness Values for Each Panel in GPa

| Panel | E1 | E2 | G12 | flex1 | flex2 | flex G |
|---|---|---|---|---|---|---|
| 1 | 68.6 | 68.6 | 7.4 | 68.6 | 68.6 | 7.4 |
| 2 | 68.6 | 68.6 | 7.4 | 68.6 | 68.6 | 7.4 |
| 3 | 50.1 | 50.1 | 16.5 | 50.1 | 50.1 | 16.5 |
| 4 | 50.1 | 50.1 | 16.5 | 50.1 | 50.1 | 16.5 |
| 5 | 50.1 | 50.1 | 16.5 | 53.9 | 53.9 | 14.8 |
| 6 | 68.6 | 68.6 | 7.4 | 68.6 | 68.6 | 7.4 |
| 7 | 68.6 | 68.6 | 7.4 | 68.6 | 68.6 | 7.4 |
| 8 | 80.2 | 80.2 | 7.7 | 80.2 | 80.2 | 7.7 |
| 9 | 58.4 | 58.4 | 7.2 | 58.4 | 58.4 | 7.2 |
| 10 | 25.6 | 25.6 | 12.4 | 25.6 | 25.6 | 12.4 |
| 11 | 50.1 | 50.1 | 16.5 | 50.1 | 50.1 | 16.5 |
| 12 | 69.3 | 69.3 | 7.4 | 69.3 | 69.3 | 7.4 |

5.4.3.2 Weave

A significant area of discrepancies between panels 4 (plain weave) and 11 (twill weave) are the frequency reflections, as previously mentioned in the observation of the signals in the time domain. The twill panel signal contains significant reflections of the high frequency S0 components when compared with the plain weave panel. This is most prevalent at the higher end of the S0 frequency range and perhaps accounts for the wider range of frequencies associated with the twill panel.

Taking into account the structure of a twill weave fabric with respect to a plain weave, it is understood that the increased number of tow undulations within a plain weave fabric results in a higher stiffness than looser weave structures like twill. This means that the wavespeed through the plain weave panel would, due to higher stiffness, be expected to be faster than through the twill. Since this is not the case and considering both twill and plain fabrics in this study have identical aerial weights (weight of fiber per unit area), it may suggest that the twill has a lower density due to superior wet-out of the fabric, causing a lower overall FVF. With reference to Table 5.8, the plain weave panel signal is observed to have a much higher ratio of A0 to S0 mode coefficients.

TABLE 5.8

Weave A0 and S0 Wavelet Coefficients

| Panel | 0° S0 | 45° S0 | 90° S0 | 0° A0 | 45° A0 | 90° A0 | S0/A0 Coefficient Ratio 0° | 45° | 90° |
|---|---|---|---|---|---|---|---|---|---|
| 4 | 0.038 | 0.021 | 0.063 | 22.9 | 20.9 | 14.9 | 488.5 | 505.3 | 244 |
| 11 | 0.076 | 0.09 | 0.07 | 20 | 20.5 | 25 | 268.9 | 216.7 | 348.4 |

Figure 15:
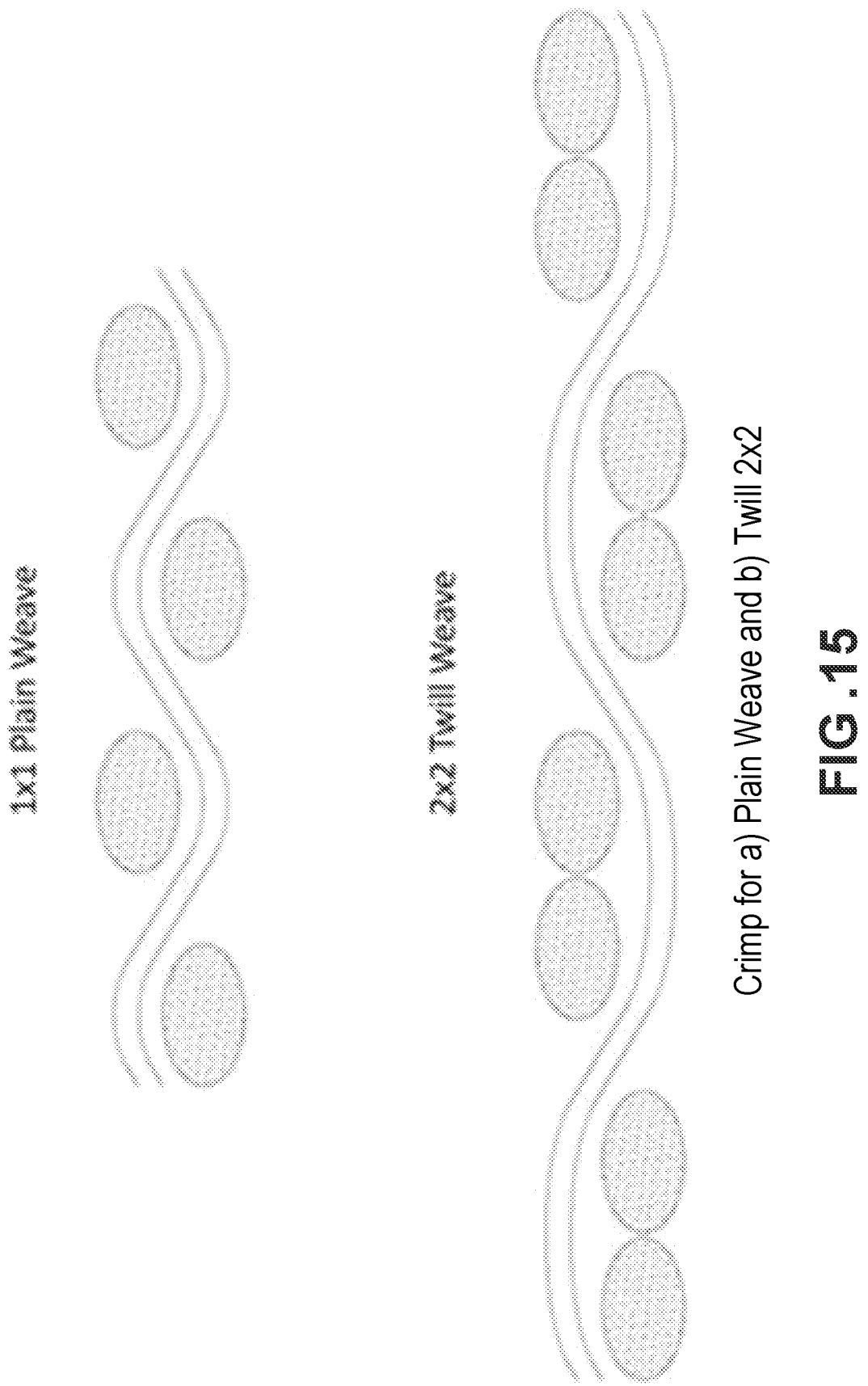
FIG. 15 illustrates example crimps for different weave types.

Since the twill fabric structure has each tow passing over two tows, the undulation count (or crimp) is half that of the plain weave (refer FIG. 15). With reference to Snell's law and the individual components energy it is clear that while the A0 mode energies are quite similar, the S0 mode energies are significantly higher in the twill specimen. At every undulation, a degree of scattering occurs due to reflection and refraction. The lower frequencies of the A0 mode mean a larger wavelength with respect to the size of the discontinuity, allowing it to "bend around" the discontinuity (diffract), thus suffering a lesser energy loss.

The scatterings/reflections and consequential interactions may then also result in a greater number of high frequency arrivals.

5.4.3.3 Tow

Direct observation of the Scalograms for the different Carbon Fiber Tows suggest stronger reflections of the S0 mode with increasing tow. However the inverse is true for A0 mode reflections. Resin saturation has a notable effect on the wavelet coefficient ratios.

An inverse correlation of coefficient ratio to saturation level is also present. It is apparent that an increase in resin with respect to the fiber content allows much higher energy from the S0 mode high frequencies to be transmitted across a distance (Table 5.9). This can be attributed to parameter variations that were identified in both the previous discussion on wavespeeds for varying resin saturations and the discussion on undulations used to describe coefficient value discrepancies between varying weave types. Although the overall wavespeed changes as a wave crosses interfaces between two media, a resin rich laminate will likely contain fewer discontinuities within the resin itself as opposed to a laminate of typical saturation levels. A resin starved laminate, on the other hand, is likely to have more discontinuities off which high frequencies will reflect and scatter, in addition to the discontinuities caused by undulations. Such discontinuities would exist in the form of voids within the laminate structure, and would thus decrease the energy transferred by high frequency modes.

TABLE 5.9

Resin Saturation A0 and S0 Wavelet Coefficients

| Panel | 0° S0 | 45° S0 | 90° S0 | 0° A0 | 45° A0 | 90° A0 | S0/A0 Coefficient Ratio | | |
|---|---|---|---|---|---|---|---|---|---|
| | | | | | | | 0° | 45° | 90° |
| 8 | 0.07 | 0.009 | 0.069 | 34.2 | 15.4 | 34.2 | 414.6 | 1720.5 | 499.6 |
| 1 | 0.222 | 0.033 | 0.305 | 38.6 | 14.8 | 34.6 | 147.1 | 444.7 | 114.4 |
| 9 | 0.305 | 0.043 | 0.35 | 26.5 | 12.5 | 30.7 | 87 | 294.1 | 79.5 |

As the glass fiber fabric was sourced as an 8-harness satin weave (refer back to FIG. 11), it is possible that the lower crimp of the fabric reduces this feature of A0 mode arrival separation. Direct comparison of the coefficient ratios along the fiber directions for the glass fiber show the ratio to be more than 4 times that of carbon fiber (Table 5.10). Overall, a significantly lower S0 mode through the glass fiber contributes to this. In addition, both the S0 and A0 mode wavelet coefficients are lower for the glass fiber panel, and considerably so for the S0 mode. With reference back to Table 5.7, the glass fiber theoretical values in both extensional and flexural stiffness (E=1.2E10, G=2.5E9) are much lower than for carbon fiber (E=1.74E10, G=3.2E9). This supports the hypothesis that S0 and A0 energy relationships correlate with extensional and flexural stiffness respectively. Comparison of the A0 wavelet coefficient ratio between glass and carbon is very close in value to the ratio of the stiffness values (1.28 and 1.26 respectively). These values can be calculated from Table 5.7.

TABLE 5.10

Fiber Type A0 and S0 Wavelet Coefficients

| Panel | 0° S0 | 45° S0 | 90° S0 | 0° A0 | 45° A0 | 90° A0 | S0/A0 Coefficient Ratio | | |
|---|---|---|---|---|---|---|---|---|---|
| | | | | | | | 0° | 45° | 90° |
| 1 | 0.222 | 0.033 | 0.305 | 38.6 | 14.8 | 34.6 | 147.1 | 444.7 | 114.4 |
| 10 | 0.045 | 0.058 | 0.05 | 30 | 20 | 26 | 618 | 318 | 524 |

5.4.3.6 Resin Type

Although the two resin types showed quite similar behavior with respect to the propagation of the maximum energy components of the A0 and S0 modes, the Cyanate Ester resin was notable for its transmittance of the mid-range frequency when compared with the epoxy based laminates. This suggests that epoxy is much more attenuative to higher frequencies than Cyanate Ester. The coefficient ratio for the Cyanate Ester panel is similarly low compared to the resin rich panel. For both the Cyanate Ester and resin rich panel the varying frequency component between panels is the low frequency A0 mode. Such similarities suggest that the Cyanate Ester panel borders on also being rich in resin.

5.5 Propagation Angle Studies

Figure 16:
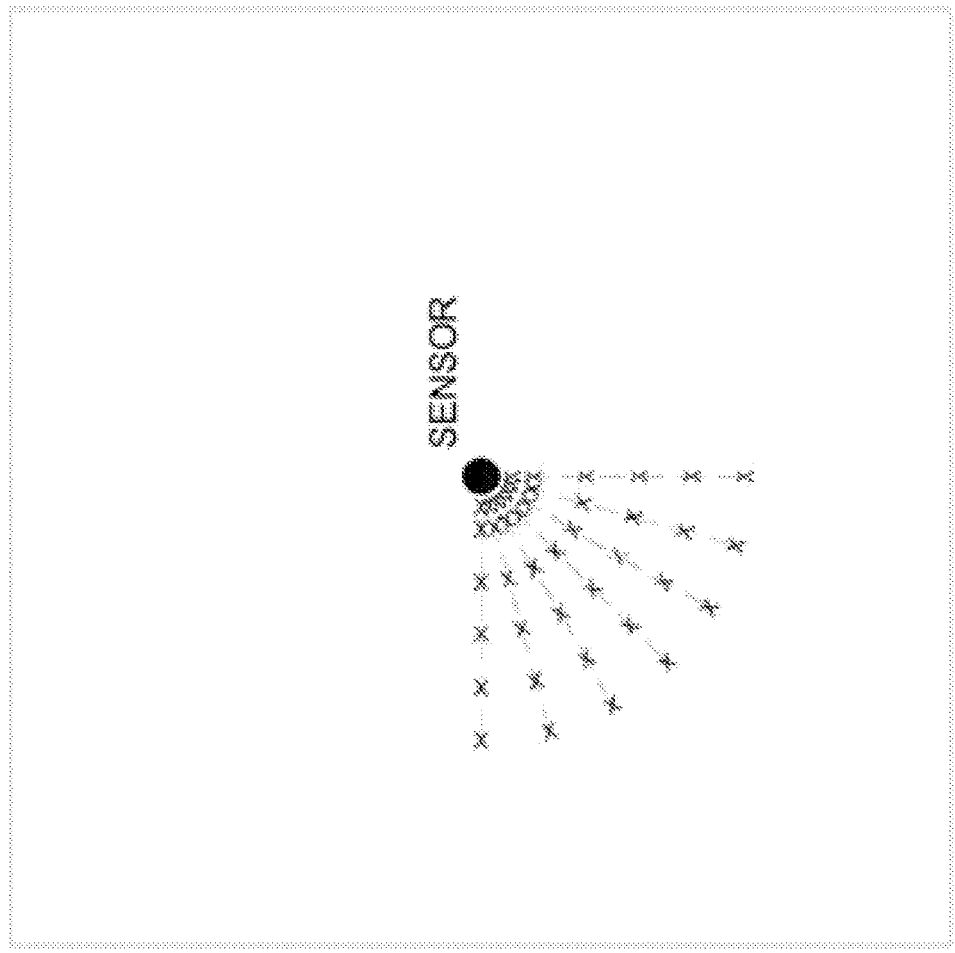
FIG. 16 illustrates an example setup for performing PLB tests relative to a senor.

High correlations exist between laminate parameters and the variations in features arising in both the frequency and time domains. This is particularly so along different propagation angles with respect to the laminate 0° direction. When conducting tests in the field, the direction of the laminate zero is often unknown. It is therefore highly likely that testing could be conducted where the test 0° reference is at an angle of 10° to the laminate 0° and the 45° and 90° reference angles are consequently also rotated by 10°. To investigate how this could affect the relationships between results, tests were performed on panels 1 and 12 with Hsu-Nielsen acoustic excitations being created at different angles and distances from a single, centrally located, broadband sensor, as shown in FIG. 16.

Coefficient ratio results are listed in Table 5.11. The ratios demonstrate a clear correlation between both A0 and S0 coefficient magnitudes with propagation angle deviations from the fiber directions, in addition to the resulting coefficient ratios. One exception is the result from the 75° propagation angle which is assumed to be a result of manufacturing error.

TABLE 5.11

Wavelet Coefficients at Angles from 0° to 90°

| Angle | S0 Max Coefficient | A0 Max Coefficient | A0/S0 |
|---|---|---|---|
| 0° | 0.32 | 32.60 | 103.49 |
| 15° | 0.11 | 22.00 | 209.52 |

TABLE 5.11-continued

Wavelet Coefficients at Angles from 0° to 90°

| Angle | S0 Max Coefficient | A0 Max Coefficient | A0/S0 |
|---|---|---|---|
| 30° | 0.06 | 16.80 | 270.53 |
| 45° | 0.04 | 15.00 | 375.00 |
| 60° | 0.06 | 15.00 | 238.10 |
| 75° | 0.05 | 15.77 | 325.15 |
| 90° | 0.20 | 27.20 | 134.32 |

Section 6 Thermography

Alternative or complementary Non-Destructive techniques can provide a valuable means to validate or complement results. Thermography, both passive and active, is relatively simple to set up set-up, and has a non-contact nature associated with the technique.

6.1 Equipment and Methodology

Thermography equipment can include of a custom adapted point heat lamp and an infrared camera. These can be connected to a National Instruments data acquisition system, which allows thermal images to be recorded concurrently with the heating profile. The camera can be a FUR A655sc high-resolution, long wave infrared camera with a 15° field of view.

Figure 17:
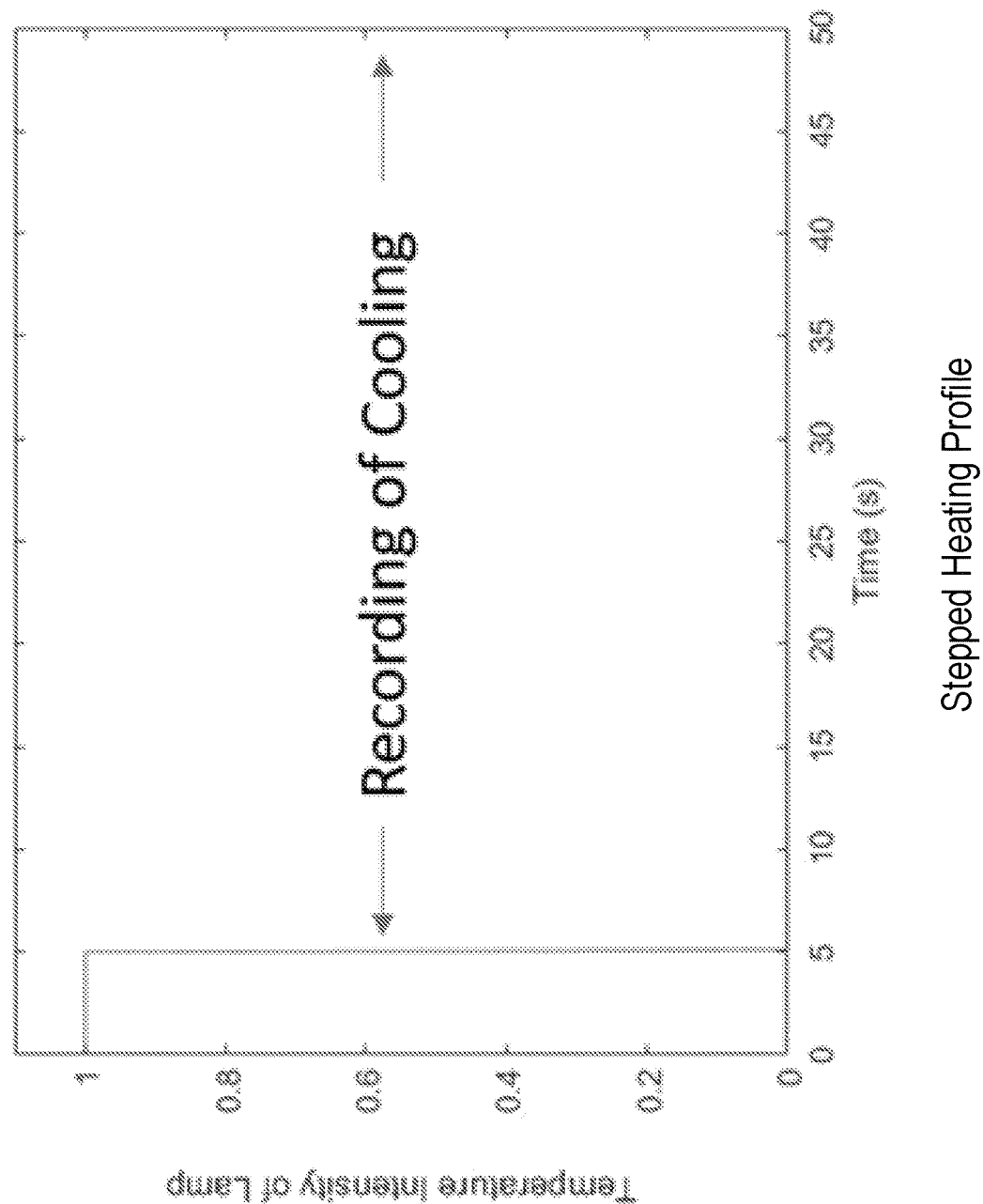
FIG. 17 illustrates an example stepped heating profile.

In one example test, the panel was heated for a duration of 5 seconds with the source adjacent to the panel, after which the heat source was removed and the cooling response was monitored over the following 45 seconds (FIG. 17).

6.2 Results and Discussion

Initial investigations showed wide variations between the different panels, particularly resulting from resin saturation and fiber type variations. High resin saturation causes a much higher initial temperature rise response to the fixed intensity heating. The Cyanate Ester panels cause a similar, albeit lesser temperature rise. The potential that this temperature rise may be due, in part, to the emissivity of the surface of the panels was considered.

The significantly lower initial temperature, after heat source removal, of the GFRP panel, indicates the need for a surface treatment. Emissivity refers to the reflectiveness of the surface or its ability to radiate heat. With reference to panels 9 and 11, panel 11 is of standard resin saturation and has a considerably more matte surface compared to the resin rich panel 9. This matte surface results in less reflections and corresponds with a high emissivity value. This higher emissivity value is more desirable in thermography testing, as a more "shiny" surface results in the temperature recorded by the camera being that of the "reflected temperature" (T-reflected), as opposed to the actual temperature of the object under investigation. Variations in temperature at the surface of an object will cause a change in the radiation emitted by an object. In the case of the semitransparent glass fiber laminate, however, it is likely that the radiation from the heat source is being absorbed through the thickness of the structure, resulting in a lower apparent temperature rise at the surface when compared with carbon fiber laminates. Slight mitigation of temperature variations arising due to these surface variations was achieved by the addition of a high emissivity, removable surface treatment, in the form of a matte adhesive contact paper.

Decay profiles after the incorporation of a matte adhesive surface treatment, show significant differences in the rate of temperature decrease resulting from fiber type variations. However, there are notable differences in the profiles, especially in the initial temperature after heating. Temperatures all increased compared with the temperatures recorded in previous tests conducted without the matte surface. These temperatures tended closer to the initial temperature of the resin rich panel recorded in the untreated tests. This suggests that the emissivity value of the contact paper was lower than expected. The inclusion of this treatment does, however, highlight that results become more uniform when emissivity and transparency of the surface is the same.

A tight grouping of consistent profiles can be observed for the carbon fiber panels of different stacking sequences, weave and resin type, whereas the decay profile resulting from heating of the fiber glass reinforced panel displays a significantly slower rate of decreasing temperature. Solely focusing on the temperature decay within two fiber types gives some useful results.

The contour plots for both the CFRP and GFRP panels illustrate the in-plane temperature propagation over time. When coupled with the observations from the temperature decay, a correlation between the shallower decay curve and the smaller diameter of the contour plot can be noted. This correlation indicates a lower thermal conductivity of the glass fibers than the carbon fibers. As a lower outward spreading of the temperature is occurring, the heat is being held at the center for longer period of time, creating a much longer decay curve.

Temperature decay profiles of panels 8 and 9 also show discrepancies in slope decline relating to resin saturation. The increasing decline of the slope correlates with decreasing resin saturation. In addition to the temperature decay profiles, in some instances there may be a correlation between temperature spread and laminate parameters that is independent of emissivity effects. Inspection of the contour plots for the resin starved and resin rich panels indicate a higher rate of in-plane temperature spread of the resin starved panel, where the temperature has propagated over a greater distance than the resin rich panel.

6.3 Thermography Findings

Thermography is a technique for the assessment of composites. Results show a defined separation of fiber type decay profiles, even with the addition of a matte surface covering. This separation is indicative of a lower thermal conductivity of glass fibers than carbon fibers.

The in-plane propagation contours present a preliminary advantage over decay profiles taken from the center of heating. This is because they are less influenced by variables that may be present in field applications. Some issues, such as emissivity variations due to different surface treatments, and environmental lighting conditions are often difficult to control in the field. mitigating the effects of emissivity by focusing on other characteristics of the temperature vs. time curve that are independent of the signal amplitude, and thus less influenced by environmental conditions is also possible.

Section 7 Boeing 787 Field Testing 7.1 Example Boeing 787 Field Test

In order to confirm results collected from laboratory testing of research panel specimens, testing was conducted during a survey of a Boeing 787 Aircraft. Readings were taken to gather information on the laminate properties of the fuselage skin of the aircraft, using both the acousto-ultrasonic and the thermography techniques employed with the experimental test panels. Data was then compared between real-world and laboratory results.

7.2 Equipment Used 7.2.1 Acousto-Ultrasonic

Testing was carried out using the S9208 Broadband sensor, allowing for direct comparisons with data collected in laboratory settings with the same sensors. For data acquisition, systems used were the Mistras Micro-ii AE system as described in Section 4 and a Pocket AE system, described by the manufacturer as a "high performance, dual-channel Acoustic Emission system packed in a rugged, portable handheld unit optimal for use as a field survey tool. The Pocket AE offers all the performance, capabilities and features of a larger, more expensive MISTRAS' AE system (wide bandwidth, speed, AE features, sampling rates, waveform processing, audible AE) in a compact, battery-operated package." The Pocket AE device was particularly useful for when set-up and breakdown time was limited, as the Micro-ii requires the set-up of a power supply, display, mouse and keyboard, which reduces the overall test time window. The use of both systems during the survey also provides the means to improve confidence in the more portable Pocket AE in future field test applications. The Pocket AE system also carries the AEWin software to set testing parameters and record data.

7.2.2 Thermography

Thermography equipment referred to in Section 6 was utilized for all testing conducted in this survey. Heating was done using both sine wave profiles and fixed intensity heating. Fixed intensity being the heating of a point on the structure by a couple of degrees and holding for a set period and then allowing it to cool and monitoring the thermal decay. Sine wave periods employed in this set testing were 15, 30, 45, 60 seconds, while fixed intensity heating was varied from 15 to 120 seconds in increments of 15 seconds.

7.3 Testing
7.3.1 Belly

Location of testing at the belly was between stringers S-39R and S-40R and Frame Stations 345 and 369. These were ascertained using reference points on the external structure and comparing them with reference diagrams. Mounting and coupling of the sensor was done using ultrasonic jelly "Ultragel II" along with red tape provided by ST Aerospace, part number 100-4. This tape is accepted by the Maintenance Repair Organization (MRO) for use on the exterior of the aircraft as it has good adhesive properties and does not leave behind a residue. This was preferable to the intention of using wax as a couplant/adhesive as it provided a small amount of pressure on the sensor while allowing for a thinner layer of adhesive and superior acoustic coupling.

7.3.1.1 Belly Calibration and Sensor Performance

Several calibration runs on the belly were carried out, with data recorded, to select an appropriate amplitude threshold and appropriate distance between the excitation and the first sensor. For Lamb wave modes to properly form, the propagation distance must be at least 10 times the thickness of the structure in question. As this quantity was unknown, estimates from literature were used to define a possible range of 30 to 50 mm based on an estimated skin thickness of approximately 2.6 mm and the distances were increased from the lower end of this range. Threshold amplitudes shown to be ideal in laboratory settings were found to be too low to filter out spurious hits resulting from background noise, however, raising the threshold resulted in important information being lost. A better approach was decided to keep the threshold amplitude as low as possible but use a front-end amplitude filter to remove any spurious recorded signals. It is important to recall the difference between these as a threshold amplitude defines the amplitude over which a signal will be recorded. If set too high a very long pre-trigger time may be required so as not to lose the earlier part of the signal. This allowed the threshold to be kept consistent with laboratory settings to facilitate hit-based feature comparisons.

7.4 Results

Results presented here are taken from the data recorded at the crown and interior in Bay 1 for wavespeed and feature analysis in both the time and time-frequency domain. Due to limited space the reading is taken at 100 mm from PLB to the far sensor along the 0° axis. Readings at this bay are selected for presentation as it was possible to collect data from the exact locations for both the interior and exterior for comparison. Results for hit based features are also shown at Bay 3, where it was possible to test a wider range of angles of wave propagation.

7.4.1 Hit Based Features
7.4.1.1 Bay 3

Due to the unknown stacking sequence of the fuselage, it wasn't possible to define a laminate zero axis. Consequently the 0° for testing was defined as the longitudinal axis of the aircraft, and measurements were recorded at multiple angles to account for the possibility of off-fiber axis testing. Hit based features are shown in Table 7.1 for propagation angles ranging from to 90°. Testing was also conducted along each angle for distances ranging from 30 mm to 100 mm, where space would allow, and it was observed that average initiation frequency decreased with distance. This must be considered when undertaking comparisons between the laboratory and B787 results, which were recorded at distances of 200 mm and 100 mm respectively.

TABLE 7.1

Hit-Based Features from 100 mm at Varied Angles

| Propagation Angle | Risetime | Counts to Peak | Initiation Frequency | Absolute Energy |
|---|---|---|---|---|
| 0° | 78.5 | 3.5 | 44.9 | 8.1E+05 |
| 15° | 68.1 | 2.7 | 39.8 | 4.8E+05 |
| 45° | 43.7 | 2.0 | 46.3 | 3.7E+05 |
| 60° | 42.6 | 2.0 | 47.4 | 5.1E+05 |

With reference to Table 7.1, the most significant finding is that the highest value of initiation frequency occurring is at a 45° propagation angle with respect to the forward axis. At this angle the initiation frequency is almost twice the values recorded at all other angles. This suggests, from section 5.5 results, that there is a strong dominance of fibers in the 45° orientation.

Absolute energy at the 45° angle, is noted as being considerably lower than for other orientations with the highest value being recorded at the 0° propagation angle. This is indicative of forward facing fiber directions in the bottom ply.

7.4.1.2 Bay 1

Comparisons between Bay 1 interior and exterior wave propagation results for the same location yielded some useful results with all values being significantly lower for the interior (Table 7.2). With reference to earlier comments on the difficulties associated with the mounting of the sensors in the interior, the large discrepancies between these signals could be a result of insufficient coupling of the sensor to the skin. With respect to the readings taken from Bay 3, the initiation frequency was noted as being higher along the same distance and axis in Bay 1, suggesting that there may exist a correlation with the thickness. Since the thickness of the skin at Bay 3 is greater than that of Bay 1, this could also suggest that the interior plain weave structure isn't actually fully coupled to the skin itself and is thinner than the fuselage skin, consequently providing lower values.

TABLE 7.2

Hit-Based Features from 100 mm Interior vs. Exterior along 0° Propagation Angle

| | Risetime | Counts to Peak | Initiation Frequency | Absolute Energy |
|---|---|---|---|---|
| Exterior | 161 | 5 | 31.8 | 5.963e6 |
| Interior | 119 | 4.2 | 35.4 | 1.25e6 |

7.4.2 Time-Frequency

The wavelet scalograms produced from the data taken from the crown were remarkably similar to those taken in the laboratory environment for the Carbon Fiber Reinforced Epoxy Resin panels. The average coefficient ratio value taken from the wavelet analysis at the 0° propagation angle was calculated at 168, which is slightly higher than the laboratory values for propagation along fiber directions in the 0° lay-ups, although as attenuation occurs over distance it is expected that this value would change with reference to the angle studies done in section 5.5. Following the same ratio that was prevalent between 100 mm and 200 mm propagation distance on the test panels, suggests that at 200 mm the B787 coefficient ratio is calculated to be approximately 210 in theory, being closest in value to the symmetric stacking sequence or the non-symmetric twill. Since the hit based results from Bay 3 suggest a prevalence towards a non-symmetric stacking sequence over the fuselage, these results add credence to the theories posited in Section 5 with respect to reduced amounts of crimp for allowing better propagation of the S0 mode, consequently lowering the coefficient ratio.

7.4.3 Thermography

Figure 18:
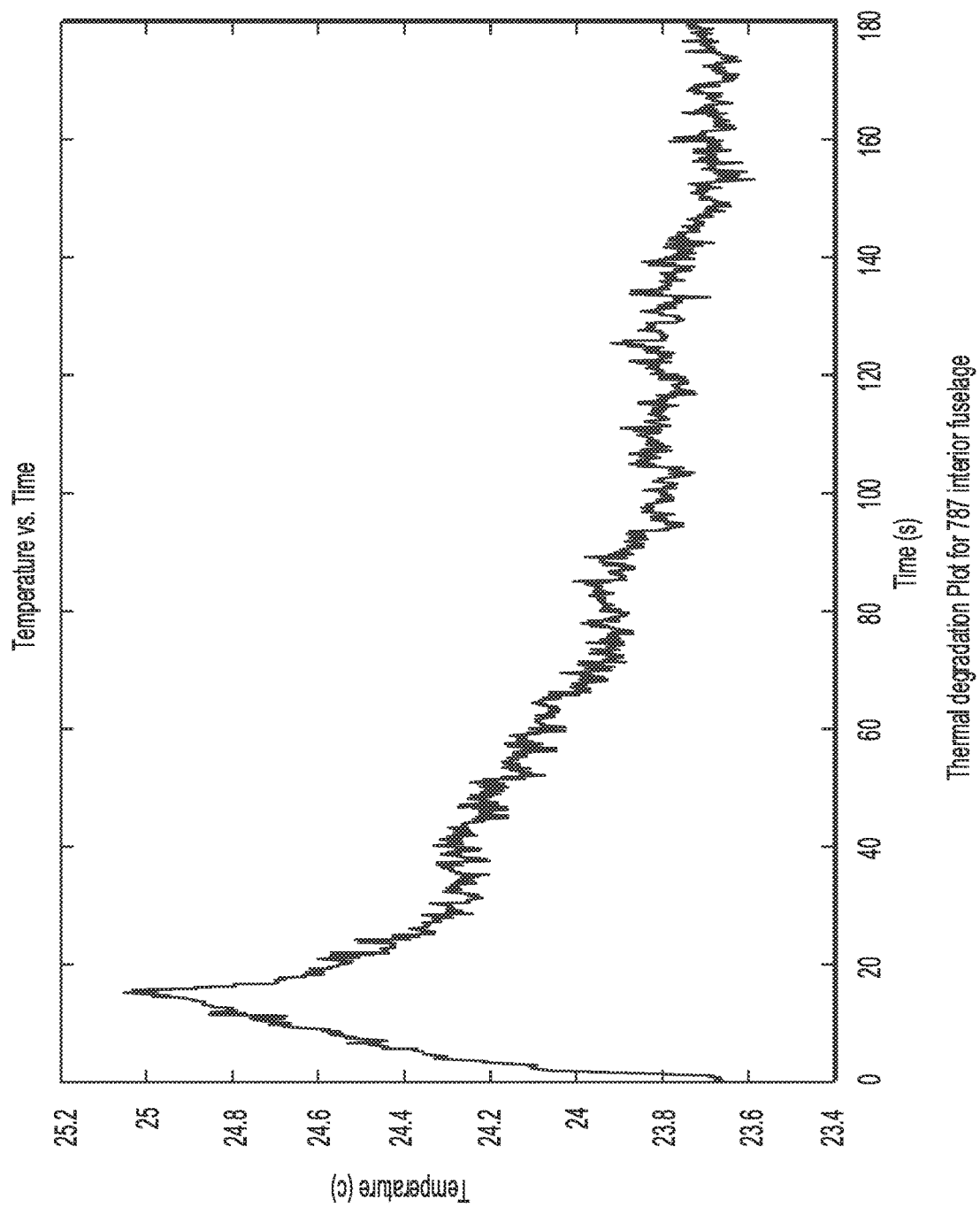
FIG. 18 illustrates thermal degradation for a 787 interior fuselage.

The results from heating the interior skin of the fuselage are shown for the fixed intensity heating period of 15 seconds in FIG. 18. These results are in line with those presented in existing literature, where the temperature decay noted by Palwak et al, for the same fixed duration heating was approximately 0.4° C. during the following 40 seconds whereas the B787 fuselage saw a decay of approximately 0.8° C. This indicates a higher FVF, the ratio of fiber to resin content), however more information with respect to the surface finishes would be required to confirm this.

Section 8 Observations and Findings

The data obtained throughout this research in both laboratory and field is compared between the two settings. This Section addresses the comparison, as well as the scope and motivation outlined at the end of Section 2. A summary of the parameters under investigation and the effects they have on the signal features discussed thus far are presented.

The investigations discussed in previous Sections yielded multiple features that highlight variations between laminates. Occasionally, such features may be similarly affected by two different laminate parameters.

8.1 Feature-Parameter Correlations

Many features were found within the time domain data for the test samples. Of these, the main features identified within the time domain that display the most significant variations with respect to changing material parameters are the wavespeed and the hit related features: Initiation Frequency and Absolute Energy.

Wavespeed varies with respect to the medium the wave travels through (refer to Section 1). This research revealed significant differences were present between panels of different materials, particularly different fibers. When measured in multiple propagation orientations, wavespeed presents itself as a good indicator of whether a laminate is composed of glass fiber (wavespeed<4000 m/s) or carbon fiber (wavespeed>5000 m/s).

This invention however, found additional relationships between the wavespeeds and the laminates. One such relationship is the differences associated with travel of waves along the fiber dominant directions and along the resin dominant directions. The wavespeed in different directions can be analyzed to provide some information on stacking sequence, as the ratio between 0° and 45° speeds lies close to unity (e.g., within 5% of 1) if an equal number of 45°/−45° to 0°/90° plies are present. Further, with respect to discrepancies in resin dominated paths, resin saturation is strongly identifiable as being within acceptable limits using wavespeed as an indicator, although this alone does not indicate whether the laminate is rich or starved in resin (<1500 m/s for both resin starved and resin rich). This tendency of resin saturation to significantly affect wavespeeds along off-fiber axes also has the potential to lead to incorrect identification of the degree of orientation of the fiber direction axes, unless it is paired with another feature that would differentiate the two. One such feature being the disparities in wavelet coefficient ratios along all angles, with primary variations in these ratios existing due to increasing and decreasing attenuation of the higher frequency S0 components of the signal.

Hit Based features must be used with care as incorrect hardware settings prior to test can lead to incorrect values being taken into consideration. When correctly set-up, however, these types of features can be very useful in the field for providing real-time information on a structure, which can be used to immediately identify certain parameters and adjust settings accordingly, should it be required. An example of reasonable parameters is: PDT-50-100 µs, HDT-100-150 µs, HLT-10-1000 µs, Amplitude Threshold-60 dB. This is useful for identifying the fiber dominant orientations to ensure that readings are taken at appropriate angles with respect to these orientations.

Initiation frequency, as a feature, also may identify such orientations, with highest values appearing consistently within the resin dominated regions. The relationship between top ply orientation and bottom ply orientation is also of significance for its impacts on hit related features. These effects are observed for initiation frequency along a particular propagation path, with values at all orientations decreasing with a lack of symmetry. This is also true with absolute energy, which is consistently lowest along the fiber dominant directions of the bottom ply.

Within both the time domain and the time-frequency domain, similarity was observed between the results, particularly the wavelet scalograms from the exterior of the B787 and the test panels, even with presence of paint. This gives confidence in the transference of laboratory developed techniques to field applications. Thus, such discoveries suggest that in the B787 investigations the bottom ply has fiber dominance in the forward direction, which subsequently suggests that the plain weave fabric is likely coupled to the unidirectional layers. A mounting system that ensures positive contact between the sensor and the material can improve the results. Finally, the absolute energy may be an appropriate measure for defining the resin saturation with respect to normal limits and thus aiding in the off-fiber axes identification through wavespeed calculations. With respect to these similarities, it is determined that the lay-up process utilized during manufacture has resulted in a high proportion of fibers at or near the 45° orientation referenced to the forward axis of the aircraft.

The coefficient ratio has clearly shown to be of importance when assessing two structures of different weave types, particularly with respect to the variances in S0 energies. It could thus be used to determine preliminary weave identifications. These weave influenced variations could either be a result of stiffness variations or scattering of the higher frequency components due to discontinuities (or a combination of the two). As stiffness coupling has shown to be highly influential on the coefficient ratio, it is important to take into consideration the wavespeed combined with the coefficient ratio to ascertain if the discrepancies are stiffness or undulation influenced.

Stacking sequence and resin type have profound effects on the A0 mode attenuation. Resin type, specifically, impacts the attenuation of the upper range of A0 mode related frequencies, with epoxy causing significant increase in attenuation at a lower frequency limit (>50 kHz) than Cyanate Ester based composites. When compared with the results of the B787 investigation, this information informs the tester that the fuselage laminate does not consist of Cyanate Ester type resin due to the significant attenuation of frequencies higher than 50 kHz, even at 100 mm from the PLB source.

Wavelet scalograms themselves provide additional visual information, with a separation in arrival time of the two different A0 mode frequency ranges evident in laminates with a higher degree of fiber alignment.

Figure 19:
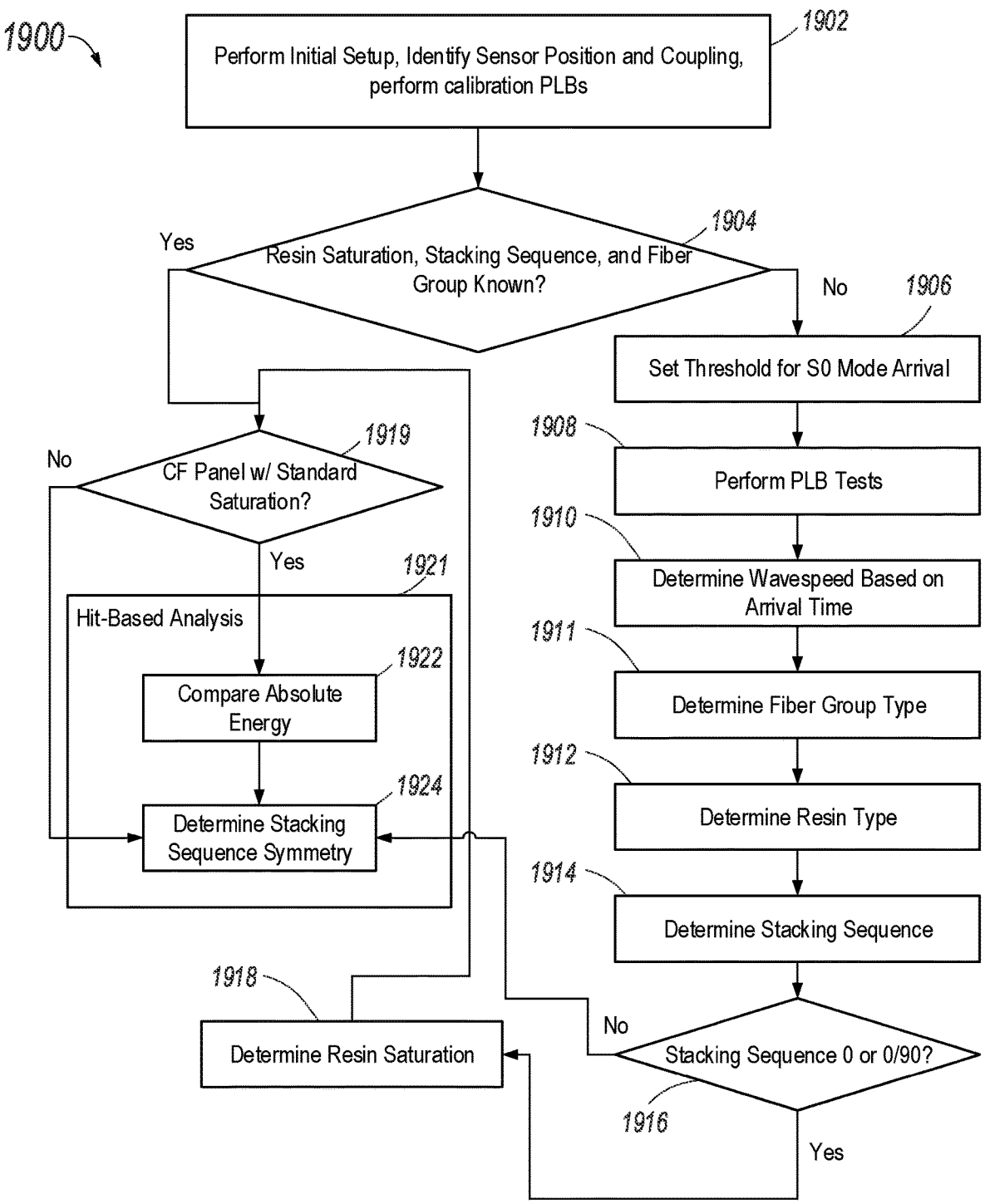
FIG. 19 is a flowchart illustrating an example process for analyzing a composite using non-destructive testing.

FIG. 19 is a flowchart illustrating an example process 1900 for analyzing a composite using non-destructive testing. Process 1900 can be completed by a trained technician, or a machine configured to perform sensing and calculations as described below (e.g., the device described in FIGS. 20A and 20B). In some instances, process 1900 may be performed by a plurality of connected components or systems. Any suitable system(s), architecture(s), or application(s) can be used to perform the illustrated operations.

At 1902, an initial setup is performed, including identifying sensor position and coupling methods for the surface/composite to be analyzed. Initially, a closest sensor is placed at a predetermined distance from an acoustic source (e.g., a pencil lead break (PLB) test) and a few individual PLBs are performed to verify the predetermined distance is sufficient to allow separation of lamb wave modes. In some implementations, 60 mm is a suitable predetermined distance for the closest sensor. The acoustic source or PLB test can be performed using a Hsu-Nielsen methodology as described above, or the ASTM standard E976-15 or other suitable acoustic emissions test.

One example procedure for performing a PLB test can include: (1) begin recording acoustic emission data, (2) ensure no disturbances are introduced by minimizing objects contacting the test surface throughout the duration of data collections, (3) using a 2H 0.3 mm mechanical pencil with a Teflon Hsu-Nielsen shoe (as described above and with reference to FIG. 5), extend the lead until approximately 2.5 mm (±0.5 mm) in length is visible, (4) position the pencil against the test surface with both lead and Hsu-Nielsen shoe touching the surface (as illustrated in FIG. 5), (5) pivot the pencil tip toward the surface, ensuring contact between the shoe and the surface is maintained, until the pencil lead breaks, (6) carefully remove the pencil, ensuring the surface is not disturbed, and (7) stop recording acoustic emission data. In some implementations, multiple lead breaks can be performed on a single recording of acoustic emission data. In some implementations, consistency in recorded signals can indicate good coupling of sensors with the surface. For example, if the peak amplitude for each repeated PLB is within ±2 dBV of the other PLBs, then it is likely that adequate coupling and equipment communications exists.

After the closest sensor is placed, one or more additional sensors are positioned further from the acoustic source (e.g., 200 mm). Additional PLB tests can be performed to ensure the additional sensors are close enough to the source that they are able to detect the S0 mode amplitude, or that the S0 mode waves have sufficient energy to overcome the threshold settings of the sensor.

Following the initial calibration PLBs, a plurality individual PLBs can be recorded, with sensors measuring wave propagation in two or more direction (e.g., at 0, 45, and 90 degree angles from a reference). This recording of the plurality of PLBs can be used for future determinations of composite parameters.

At 1904, if the resin saturation, stacking sequence, and fiber group of the composite being tested is known, process proceeds to 1920, however if these parameters are not known, process 1900 proceeds to 1906.

At 1906, a threshold is set that is sufficient to ensure the S0 Mode waveforms are detected by the sensors. The threshold is selected such that is low enough to avoid hits recorded from background noise, but not so high as to lose the detection of the S0 mode, which typically has a much smaller amplitude than the A0 mode waveforms. See e.g., FIG. 13 illustrating an example waveform produced by a PLB test. Once a proper threshold is set, process 1900 proceeds to 1908.

At 1908, one or more PLB tests are performed. In some implementations, multiple PLB tests are performed at multiple, predetermined locations from the sensors (e.g., 60 mm from the closest sensor and 200 mm from the furthest sensor at different angles). In other implementations, multiple PLB tests are performed in a single location, with multiple sensors, or sensors being relocated between tests. Regardless, acoustic emissions are recorded as they pass through the composite material in two or more directions.

At 1910, wavespeed of the acoustic emissions within the composite is determined based on arrival time. Wavespeed can be determined based on a measured time of arrival for each of the two or more sensors. For example, if there is a 25.4 µs time delay between when the wave reaches the closest sensor and the second sensor, and the sensors are located 140 mm apart, then the wavespeed for that particular wave is 5500 m/s, which corresponds to a carbon fiber composite, assuming the composite is of standard resin saturation. This is calculated using a distance is equal to speed multiplied by time formula.

Once wavespeed is known, at 1911, fiber group type can be determined based on the wavespeed. For example, wavespeeds in carbon fiber materials are typically approximately 5,500 m/s, in fiberglass materials wavespeeds are approximately 3800 m/s, in quartz fiber materials, approximately 2000 m/s, and in aramid materials wavespeeds are approximately 4900 m/s. In some implementations, the fiber group type is determined based on selecting the wavespeed that most closely matches a nominal wavespeed associated with the fiber group type. In some implementations, further analysis, such as averaging, clustering, a neural network, or other signal processing system is used to identify fiber group type based on the wavespeed.

At 1912, resin type is determined. Resin type is determined by analyzing the waves created in the mid frequency range (e.g., 75-120 kHz). In this frequency range, the duration of the waveform can be observed to distinguish between cyanate ester type resin and epoxy type resin. Duration can be defined as time above a set threshold of 70 dB and within the parameters for a hit definition. For example, observing at 200 mm from the PLB test, a duration greater than about 750 µs (typically 900-1300 µs) indicates a cyanate ester resin type, while a duration below about 750 µs (typically in the range of 1-500 µs) indicates an epoxy resin type. This is consistent in woven or uniform composite types, as well as in resin saturated or resin starved composites. Therefore, at step 1912, resin type can be determined by observing the duration of energy produced by the PLB tests.

At 1914, a stacking sequence for the composite material is determined. The stacking sequence is determined based on a comparison of wavespeeds in multiple propagation directions. By recording wavespeed in three or more propagation directions, or if the direction of at least one ply is known, then a wavespeed in the 0 degree direction (e.g., in the same direction as a reference ply of the composite) and a wave speed in a 45 degree direction (e.g., 45 degrees of axis as the reference ply) can be determined. If there is an approximately 1:1 ratio (e.g., 1.1:1-0.9:1) between wavespeeds in the 45 degree direction and the 0 degree direction, then it can be determined that there is an equal number of 45 degree plies and 0 degree plies in the stacking sequence.

In some implementations, wavespeed in the 0 degree direction is determined by directly measuring it. In other implementations, where the direction of a reference ply is unknown, it can be determined by interpolating wavespeeds in two or more directions. For example, wavespeed can be recorded in a set first direction, a second direction that is 45 degrees offset from the first direction, and a third direction that is 90 degrees offset from the first direction. A reference ply can be determined by assessing the initiation frequency of each measured wavespeed. Additionally, in some implementations, interpolation (e.g., linear interpolation, or polynomial fitting) can be used to estimate wavespeeds in intermediate directions that were not directly measured.

If the ratio of wavespeeds in the 0 degree direction to the 45 degree direction is greater than 1.3:1, it can be determined that all of the plies in the stacking sequence are oriented in the same direction. If the composite include plies that are stacked in the 0 degree direction and 90 degree direction, and the wavespeed ratio is less than 1.3:1, then the composite includes an equal number of plies in the 0 degree and 90 degree direction.

In addition to assessing wavespeed, initiation frequency and absolute energy can be assessed in order to determine stacking sequence.

At 1916, if the stacking sequence is not determined to be a 0 degree or 0/90 degree stacking sequence, process 1900 proceeds to 1924 where further hit-based analysis is, optionally, performed. If the stacking sequence is either a 0 degree or 0/90 degree stacking sequence, then process 1900 proceeds to 1918.

At 1918, resin saturation is determined. Using the wavespeed ratio from the stacking sequence determination (1914), an amount of resin saturation can be determined for 0 degree or degree stacking sequence composites. If there is a standard resin saturation amount, the wavespeed ratio will be relatively closer to unity (e.g., less than 2:1). However, as the composite approaches a resin starved, or a low resin saturation state, the wavespeed decreases in off-fiber-axis propagation, causing the wavespeed ratio to increase (e.g., greater than 2:1). Similarly in resin rich, or high resin saturated composites, wavespeed ratio will be large (e.g., greater than 2:1). Therefore if the wavespeed ratio is greater than approximately 2:1, (e.g., 1.5:1 to 100:1) it can be determined that the resin saturation of the composite is non-standard (e.g., either low or high). Further, if the wavespeed ratio is large (e.g., greater than 2:1) and higher energy values are observed (e.g., greater than 2000 aJ at 60 mm from the source), the composite is resin starved.

At 1920, if the composite being tested is not carbon fiber with a standard resin saturation, then process 1900 proceeds to 1924 to identify the stacking sequence symmetry. If the composite being tested is a carbon fiber and has a standard resin saturation, Hit-based analysis can be used to identify the tow of the composite material at 1922, if the resin type is known.

At 1921, hit based analysis is performed, identifying certain hit based features. Hit based analysis includes the measurement of timing parameters of the experiment. For example, absolute energy, amplitude, time delay/difference, initiation frequency, etc.

At 1922, By measuring absolute signal energy, the composite tow can be identified. Table 8 below demonstrates some example tows which are identified based on absolute energy ranges recorded. All energies in table 8 are listed in atta-Joules.

TABLE 8

| 3K Tow, 0° Lay-up, along Fiber | 3K Tow, all other | 12K Tow, 0° Lay-up, along Fiber | 12K Tow, all other |
|---|---|---|---|
| $8 \times 10^6 - 1.2 \times 10^7$ | $4 \times 10^6 - 6 \times 10^6$ | $6 \times 10^6 - 7 \times 10^6$ | $1 \times 10^6 - 2 \times 10^6$ |

At 1924, the stacking sequence symmetry is determined. The extensional (S0) and flexural (A0) modes of lamb wave modes are related to the extensional and flexural stiffness of the supporting structure. Consequently, the relationship between the energy of the two primary modes is an indicator of the stiffness properties of a thin plate type structure. Higher wavelet coefficient ratios correspond with lower flexural stiffness with respect to the extensional stiffness. This ratio of S0 to A0 energy provides supplemental information on the stacking sequence that is independent of influencing factors such as resin saturation. Unsymmetrical panels show greater variation in coefficient ratios than symmetric panels but have equivalent wavespeed ratios. A coefficient ratio that varies by a magnitude of approximately 2 or higher, between propagation directions, is indicative of an unsymmetrical panel.

All data recorded or collected, as well as other determined information (e.g., stacking sequence) can be exported at the conclusion of process 1900, to external system for further analysis (e.g., additional time-frequency analysis.

Figure 20A:
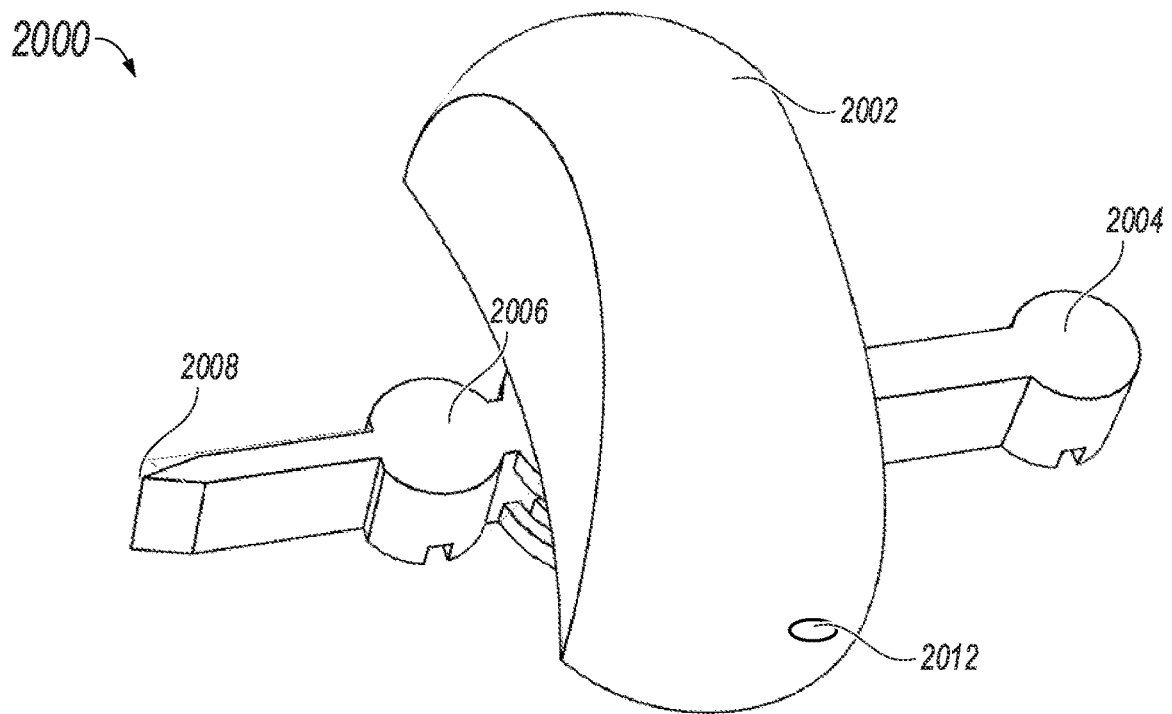
FIGS. 20A and 20B depict an example device for performing non-destructive analysis of composite materials.
Figure 20B:
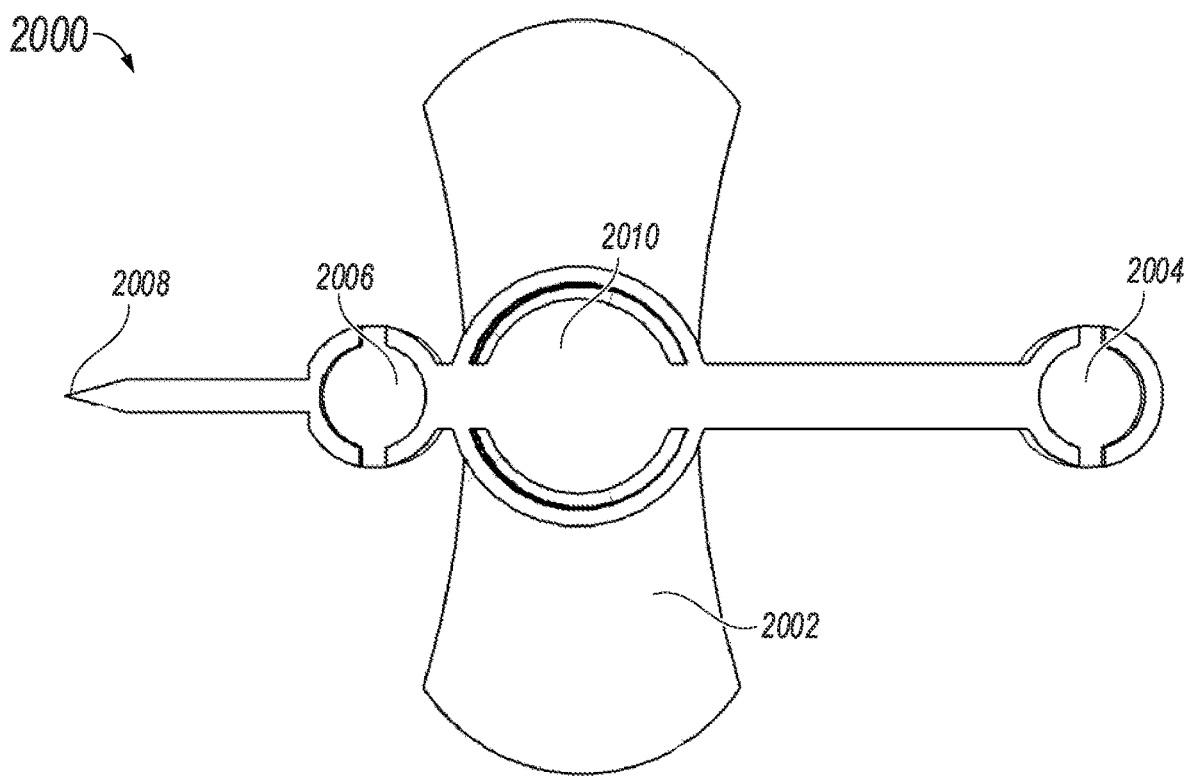

FIGS. 20A and 20B depict an example device 2000 for performing non-destructive analysis of composite materials. FIG. 20A shows a perspective view of device 2000, while FIG. shows a bottom view. Device 2000 includes a handle 2002, a mount for a distal sensor 2004, a mount for a proximal sensor 2006, a test point indicator 2008, and a coupler 2010.

The proximal sensor mount 2006 and distal sensor mount 2004 can be configured to receive one or more sensors configured to generate an electrical signal based on acoustic energy measured from the surface of a composite material. Sensors can include, for example, A PK61 resonant acoustic emission sensor, a PK 151 resonant acoustic emission sensor, a PK31 resonant acoustic emission sensor, or other suitable sensor.

In some implementations, the proximal and distal sensor mounts (2004 and 2006) are adjustable, such that a distance between the respective mount and the test point indicator 2008 can be changed. For example, sensor mounts 2004 and 2006 can be configured to slide along a support arm. In some implementations, the sensor mounts 2004 and 2006 can be removable from and reattach-able to device 2000 in order to permit multiple different sensor layouts. Additionally, while only two sensor mounts are illustrated, some implementations may have additional mounts. For example, in some implementations, five sensor mounts are included with three additional arms (not shown) holding sensors at different angles, positions, or distances from test point indicator 2008.

Handle 2002 provides a grip point, where a user can hold or position the device 2000 on a composite material to be tested. In some implementations, handle 2002 includes internal electronics, such as a battery or other energy source, as well as one or more processors that perform sensing, recording, analyzing, or other operations associated with device 2000. The battery or other energy source can provide electrical power to one or more sensors (e.g., sensors installed in sensor mounts 2004 and 2006) and/or one or more transducers. In some implementations, handle 2002 includes additional sensors, such as an accelerometer, or GPS receiver, to assist in noise filtering and location identification. Handle 2002 can further include an IO port 2012, which can provide for a wired connection to an external system such as a computing device, or power supply.

Test point indicator 2008 can be an arrow, or a guide indicating where PLB tests should be performed. In some implementations, test point indicator 2008 includes a pencil holder, to permit consistent PLBs. In some implementations, instead of an indicator, a transducer is positioned, which performs the PLB test automatically, or based on user input (e.g., a user depressing a button on handle 2002 can initiate a PLB test by a transducer mounted to the device 2000).

Coupler 2010 can be a mechanism or system to ensure that sensors in sensor mounts 2004 and 2006 make positive contact with the composite material to be tested. In some implementations coupler 2010 is merely a pad (e.g., rubber or cloth) that ensures the device 2000 does not slide/slip when pressed against a composite material. In some implementations coupler 2010 includes an adhesive, or a nano tape, configured to allow the device 2000 to be "stuck" to the surface of the composite and later removed without damaging the composite. In some implementations, coupler 2010 includes one or more suction cups that use ambient pressure to temporarily affix the device 2000 to a composite to be tested.

By generating a definition of certain frequency ranges of interest within the S0 and A0 Lamb wave modes as well as useful features within these ranges. Specific excitation of these frequencies can be observed and implemented in field ready techniques for non-destructive laminate parameter identification. These techniques use separate small frequency range excitations to isolate parameter specific features.

In industry, even destructive burn tests have proven unreliable in identifying Resin type from laminate test specimens. The finding that the high range A0 mode frequencies are attenuated far less through a Cyanate Ester resin than through an Epoxy resin is a significant discovery that may be further exploited to develop resin signatures.

In addition, notable findings on the variations individually carried by the peak A0 and S0 frequency components, with respect to different laminate parameters, are highly significant to the design of structural alterations. This is particularly so with regards to stiffness and fiber orientation.

Other advantages of the disclosed solutions include that the PLB technique can be used to identify how the different peak A0 and S0 frequency components will individually carry variations with respect to different laminate parameters.

Additionally, wavespeed variations provide a quick method of identifying fiber type, being significantly lower in all directions for GFRP vs. CFRP.

Additionally, wavespeed may be manipulated to provide some information on stacking sequence, as the ratio between 0° and 45° speeds lies close to unity if an equal number of 45°/−45° to 0°/90° plies are present.

Additionally, resulting signals from the tested composites vary significantly in the lower ultrasonic frequency ranges. This is due to laminate parameters such as material type and structural lay-up variations. For example, flexural stiffness is higher for symmetric panels than for unsymmetric panels, thus resulting in a higher energy of the signal in a symmetric panel.

Additionally, resin saturation can significantly affect wavespeeds along off-fiber axes. This also has the potential to lead to incorrect identification of the degree of orientation with respect to the fiber direction axes, if not paired with another feature that would differentiate the two. Examples of such features include observation of high frequency (e.g., greater than 120 kHz) scattering in resin rich composites, and high initial energy (e.g., greater than 2,000 aJ at 60 mm from the source) in resin starved composites.

Additionally, hit based features are useful for identifying the fiber dominant orientations in real-time, in order to ensure that readings are taken at appropriate angles with respect to these orientations.

Additionally, thermography testing can be used for identification of material type when potential false results due to reflections are addressed.

Additionally, resin types affect transmission of frequency components within the 75-120 kHz range differently, therefore interrogation of resins can be performed by applying specific focus on the higher frequency arrival A0 mode.

Additionally, S0 mode wavelet variations can be used for identifying crimp influenced discontinuities, through lower values being more prevalent in higher crimp rates.

Additionally, these techniques can also determine inconsistencies within a 3D-printed part that may cause changes to expected structural behavior.

Additionally, further techniques employing PZT transducers coupled with angled Perspex wedges allows for ascertaining whether potential interference due to influencing factors from other modes, such as mode conversion, scattering and attenuation, is present.

The foregoing description is provided in the context of one or more particular implementations. Various modifications, alterations, and permutations of the disclosed implementations can be made without departing from scope of the disclosure. Thus, the present disclosure is not intended to be limited only to the described or illustrated implementations, but is to be accorded the widest scope consistent with the principles and features disclosed herein.

The invention claimed is:

1. A method for non-destructively identifying properties of a composite material comprising:
    inducing an acoustic event on the composite material at a predetermined location relative to two or more sensors;
    receiving information from the sensors associated with the acoustic event;
    identifying a variation in peak fundamental antisymmetric (A0) mode and fundamental symmetric (S0) mode frequency components of the received information;
    determining one or more laminate parameters of the composite material based on the variation;
    identifying a wavespeed of acoustic waves from the acoustic events; and
    determining, based on the identified wavespeed, a fiber type of the composite material.

2. The method of claim 1, wherein the identified wavespeed comprises identified wavespeed in at least a first direction of propagation and a second direction of propagation, wherein the second direction of propagation is at least 45° different than the first direction of propagation, the method further comprising;
- dividing the identified wavespeed in the first direction of propagation by the identified wavespeed in the second direction of propagation to determine a wavespeed ratio; and
- determining, in response to the wavespeed ratio being in the range of 0.95 to 1.05, that an equal number of plies oriented in two different directions are present in the composite material.

3. The method of claim 1, wherein determined fiber type is at least one of carbon fiber, aramid fiber, quartz fiber, or glass fiber.

4. The method of claim 1, wherein the determined laminate parameters comprise resin type.

5. The method of claim 4, wherein the resin type comprises at least one of epoxy resin or Cyanate Ester resin.

6. The method of claim 1, wherein the acoustic events are Hsu-Nielsen Pencil Lead Break (PLB) events or simulated acoustic emission events.

7. The method of claim 1, wherein the two or more sensors form an array of sensors comprising a primary sensor, wherein the primary sensor is located 60 mm from a first acoustic event, and wherein the sensor array comprises a secondary sensor located 200 mm from the first acoustic event.

8. The method of claim 7, wherein the sensors in the array of sensors are at least one of broadband S9208 acoustic sensors, PK 31 sensors, PK 61 sensors, or PK 151 sensors.

9. The method of claim 1, wherein the predetermined location comprises a plurality of predetermined locations comprising a plurality of rows of locations at 30 mm, 50 mm, 100 mm, 150 mm, 200 mm, and 250 mm distances from the sensors, each row of locations extending from the sensors at a 15° angle from adjacent rows of locations.

10. The method of claim 1, wherein the peak fundamental antisymmetric (A0) mode is in the range of 20 to 120 kHz, and wherein the fundamental symmetric (S0) mode frequency is in the range of 170 to 625 kHz.

* * * * *